United States Patent
Akiyama

(10) Patent No.: US 9,632,107 B2
(45) Date of Patent: Apr. 25, 2017

(54) MOVEMENT AMOUNT ESTIMATION SYSTEM, MOVEMENT AMOUNT ESTIMATION METHOD AND MOBILE TERMINAL

(71) Applicant: Hitachi, Ltd., Chiyoda-ku, Tokyo (JP)

(72) Inventor: Takayuki Akiyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 440 days.

(21) Appl. No.: 14/382,895

(22) PCT Filed: Jan. 21, 2013

(86) PCT No.: PCT/JP2013/051099
§ 371 (c)(1),
(2) Date: Sep. 4, 2014

(87) PCT Pub. No.: WO2013/136843
PCT Pub. Date: Sep. 19, 2013

(65) Prior Publication Data
US 2015/0027200 A1    Jan. 29, 2015

(30) Foreign Application Priority Data
Mar. 13, 2012    (JP) .................... 2012-055646

(51) Int. Cl.
*G06F 19/00* (2011.01)
*G01P 21/00* (2006.01)
(Continued)

(52) U.S. Cl.
CPC .............. *G01P 21/00* (2013.01); *G01C 21/16* (2013.01); *G01C 21/206* (2013.01); *G01C 22/00* (2013.01); *G01S 5/0252* (2013.01); *G01S 5/0263* (2013.01)

(58) Field of Classification Search
CPC ............ A63B 2225/50; A63B 2220/40; A61B 5/1122
(Continued)

(56) References Cited

U.S. PATENT DOCUMENTS 9,267,793 B2 *   2/2016   Vock ................... A43B 3/00
2003/0163287 A1 *  8/2003   Vock ................... A43B 3/0005
                                                      702/187
2013/0304685 A1    11/2013  Kurata et al.

FOREIGN PATENT DOCUMENTS

JP    10-147479 A    6/1998
JP    2003-329705 A   11/2003
(Continued)

OTHER PUBLICATIONS

International Search Report (PCT/ISA/210) dated Apr. 23, 2013 with English translation (four pages).
(Continued)

*Primary Examiner* — Edward Raymond
(74) *Attorney, Agent, or Firm* — Crowell & Moring LLP

(57) ABSTRACT

A movement amount estimation system, comprising a storage area to store acceleration data, for estimating a movement amount of a holder of a mobile terminal, the movement amount estimation system is configured to: detect a start time and an end time of an elevator riding time period of the holder based on the acceleration data; integrate the acceleration data from the start time to the end time to calculate a movement velocity of the holder; correct one of a movement velocity at the start time and a movement velocity at the end time based on another of the movement velocity at the start time and the movement velocity at the end time; and integrate the movement velocity corrected by the time period to estimate a movement amount of the holder when the holder uses an elevator.

15 Claims, 22 Drawing Sheets

(51) Int. Cl.
*G01C 21/20* (2006.01)
*G01C 21/16* (2006.01)
*G01C 22/00* (2006.01)
*G01S 5/02* (2010.01)

(58) Field of Classification Search
USPC .......................... 702/96, 150, 151, 182–185
See application file for complete search history.

(56) References Cited

FOREIGN PATENT DOCUMENTS

| | | |
|---|---|---|
| JP | 2006-170879 A | 6/2006 |
| JP | 2006-287711 A | 10/2006 |
| JP | 2009-229204 A | 10/2009 |
| JP | 2011-81431 A | 4/2011 |
| WO | WO 2010/088009 A1 | 8/2010 |
| WO | WO 2010/111402 A1 | 9/2010 |

OTHER PUBLICATIONS

Japanese-language Written Opinion (PCT/ISA/237) dated Apr. 23, 2013 (four pages).
Japanese Office Action issued in counterpart Japanese Application No. 2012-055646 dated Dec. 8, 2015 with English translation (six pages).

\* cited by examiner

| 301 | 302 | 303 | 304 |
|---|---|---|---|
| TIME | ACCELERATION X | ACCELERATION Y | ACCELERATION Z |
| T1 | X_A1 | Y_A1 | Z_A1 |
| T2 | X_A2 | Y_A2 | Z_A2 |
| T3 | X_A3 | Y_A3 | Z_A3 |
| ... | ... | ... | ... |

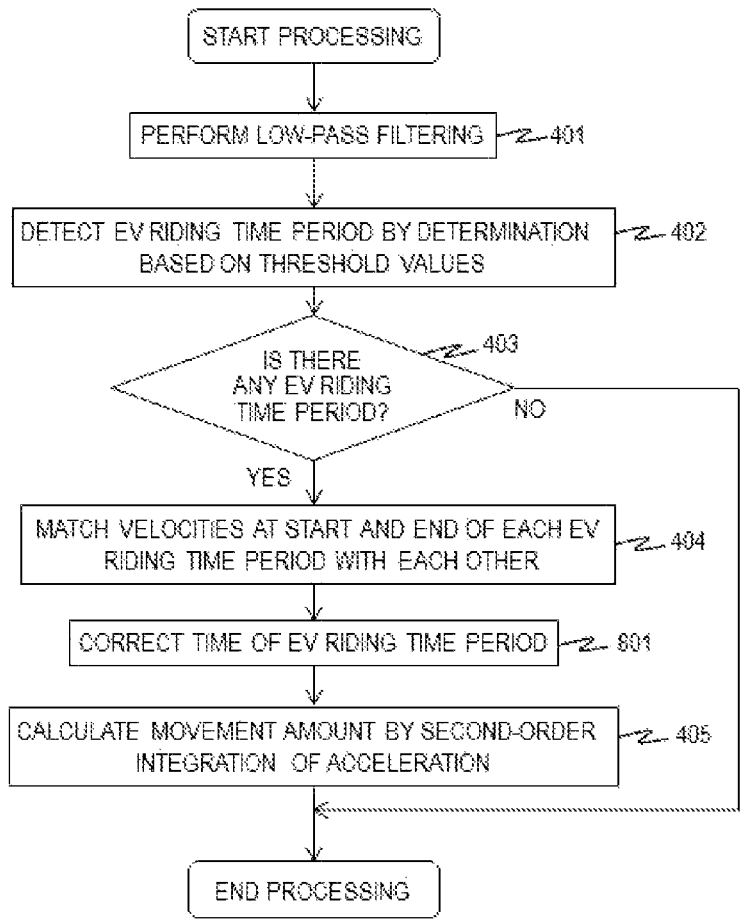

| BUILDING ID | ID | TYPE | ATTRIBUTE | BASE FLOOR | NAME | COORDINATES |
|---|---|---|---|---|---|---|
| ID_B1 | ID_1 | OUTER SHAPE | OUTER SHAPE | 1F | FLOOR | (X1, Y1), (X2, Y2), (X3, Y3) |
| ID_B1 | ID_2 | FLOOR JUNCTION POINT | ELEVATOR | 1F, 2F, 20F | MAIN ELEVATOR | (X1, Y1) |
| ID_B1 | ID_3 | FLOOR JUNCTION POINT | STAIRS | 1F, 2F | MAIN STAIRS | (X2, Y2), (X3, Y3) |
| ... | ... | ... | ... | ... | ... | ... |

*Fig. 21*

MOVEMENT AMOUNT ESTIMATION SYSTEM, MOVEMENT AMOUNT ESTIMATION METHOD AND MOBILE TERMINAL

CLAIM OF PRIORITY

The present application claims priority from Japanese patent application JP 2012-55646 filed on Mar. 13, 2012, the content of which is hereby incorporated by reference into this application.

BACKGROUND OF THE INVENTION

This invention relates to a movement amount estimation system for estimating a movement amount of a holder of a mobile terminal, in particular, a movement amount estimation system for estimating a movement amount based on acceleration data measured by an acceleration sensor included in the mobile terminal.

As a result of the drastic development of portable information terminals as represented by smartphones, the markets of location-based services for specifying location information of a holder of the terminal have been expanding.

As the location-based services, there exist a service for collecting previous movement loci of a terminal to provide marketing based on the location to which the terminal holder has moved and a service for associating the movement loci and various types of sensor data with each other to provide a wide range of sensing.

In general, the location information of the holder of the terminal is calculated by reception of a global positioning system (GPS) signal by the terminal. Various positioning methods, which enable positioning of the location of the terminal even in the case where the holder of the terminal is located indoor where the terminal cannot receive the GPS signal, have been established. The positioning methods include an environmental positioning method and an autonomous positioning method. The environmental positioning method involves the installation of positioning equipment on an environment side, whereas the autonomous positioning method does not involve the installation of positioning equipment on the environment side.

The positioning equipment to be installed on the environment side has not been widespread yet. Therefore, the use of the autonomous positioning method is effective, in particular, for an indoor positioning method with which a target region to be positioned extends over a wide range.

As the autonomous positioning method, there is known a technology for calculating a movement amount in a horizontal direction by using a three-axis acceleration sensor (see, for example, JP 2003-329705 A). There is also known a method for estimating a walking velocity of the holder of the terminal in the horizontal direction and a walking direction of the holder of the terminal in the horizontal direction based on data measured by the three-axis acceleration sensor, a magnetic direction sensor, and a gyro (angular velocity) sensor.

However, the movement of the holder of the terminal, who is inside of a building, includes not only the movement in the horizontal direction on the same floor but also the movement in a vertical direction between floors.

Although a method of calculating a movement amount in the vertical direction by using a barometric sensor or the like is known, the barometric sensor is not mounted in general portable information terminals. Therefore, the movement amount in the vertical direction is desired to be calculated by using an acceleration sensor, which is mounted in the general portable information terminals.

SUMMARY OF THE INVENTION

In this context, there is known a technology of calculating the movement amount in the vertical direction with stairs, an escalator, and an elevator based on a peak of an acceleration in a height direction (see, for example, JP 2006-170879 A). Moreover, there is also known a technology of recognizing upward and downward movement with the elevator based on a pattern of acceleration sensor data (see, for example, JP 2011-081431 A).

With the technology disclosed in JP 2006-170879 A, a time period for calculating an average of the accelerations based on the acceleration peak is calculated so as to detect the downward movement on the stairs, which has the same period of the acceleration peak as that of walking (see paragraph of JP 2006-170879 A). In the case where the holder of the terminal rides the elevator, the holder of the terminal does not walk normally. Therefore, the period of the acceleration peak while the holder of the terminal is in the elevator differs from the period of the acceleration peak while the holder of the terminal is walking. Thus, even if the time period used to calculate the average of the accelerations while the holder of the terminal is in the elevator is determined by using the same method as that used for the case where the holder of the terminal walks or takes the stairs, an elevator riding start time and an elevator riding end time cannot be detected accurately based on the average of the accelerations for the time unit described above.

Moreover, JP 2006-170879 A discloses neither the inability to calculate the accurate elevator riding start time and elevator riding end time nor the adjustment of an error of the movement amount of the elevator due to an error of the acceleration sensor itself.

The technology disclosed in JP 2011-081431 A does not calculate the movement amount of the elevator by detecting the raising or lowering of the elevator based on the acceleration pattern. Further, JP 2011-081431 A does not disclose the adjustment of the error of the movement amount of the elevator, as in the case of JP 2006-170879 A.

This invention has an object to provide a movement amount estimation system capable of accurately calculating a movement amount with an elevator by adjusting an error of the movement amount of the elevator caused by inability to calculate accurate elevator riding start time and elevator riding end time and by an error of an acceleration sensor itself.

One typical example of the invention disclosed in the present application is described as follows. A movement amount estimation system, comprising a storage area configured to store acceleration data including a time of measurement by an acceleration sensor which a mobile terminal has and an acceleration measured by the acceleration sensor, for estimating a movement amount of a holder of the mobile terminal based on the acceleration sensor data, the movement amount estimation system further comprising: an elevator riding time period detection part configured to detect a start time and an end time of an elevator riding time period of the holder based on an increase and decrease of the acceleration data stored in the storage area; a movement velocity calculation part configured to integrate the acceleration data from the start time to the end time by a time period from the start time to the end time to calculate a movement velocity of the holder from the start time to the end time; a movement velocity correction part configured to correct one of a movement velocity at the start time and a movement velocity at the end time based on another of the movement velocity at the start time and the movement velocity at the end time; and a movement amount estimation part configured to integrate the movement velocity corrected by the movement velocity correction part by the time period from the start time to the end time to estimate a movement amount of the holder when the holder uses an elevator.

A brief description is now given of effects provided by the exemplary embodiment of this invention disclosed in this application. This invention enables to provide a movement amount estimation system capable of accurately calculating a movement amount with an elevator.

BRIEF DESCRIPTION OF THE DRAWINGS

FIG. 8 is a flowchart of the movement amount estimation processing according to the second embodiment of this invention;

FIG. 9 is an explanatory diagram of an EV riding time period correction parameter according to the second embodiment of this invention;

FIG. 21 is an explanatory diagram of floor data according to the eighth embodiment of this invention;

DETAILED DESCRIPTION OF THE PREFERRED EMBODIMENTS

First Embodiment

Now, a first embodiment of this invention is described referring to FIGS. 1 to 6.

When a movement amount of a holder of a mobile terminal 200 is to be estimated based on acceleration data (acceleration sensor data 131) measured by an acceleration sensor 250 included in the mobile terminal 200, a movement amount estimation system according to the first embodiment corrects a moving velocity at one of an elevator riding start time and an elevator riding end time based on another thereof and integrates the corrected moving velocity at the start time and the end time of the riding time period to estimate the movement amount of the holder of the mobile terminal 200 when the holder uses the elevator. In this manner, an error of the acceleration in a height direction, which is detected by the acceleration sensor 250, can be reduced. As a result, the movement amount of the holder when the holder uses the elevator can be estimated accurately.

Figure 1:
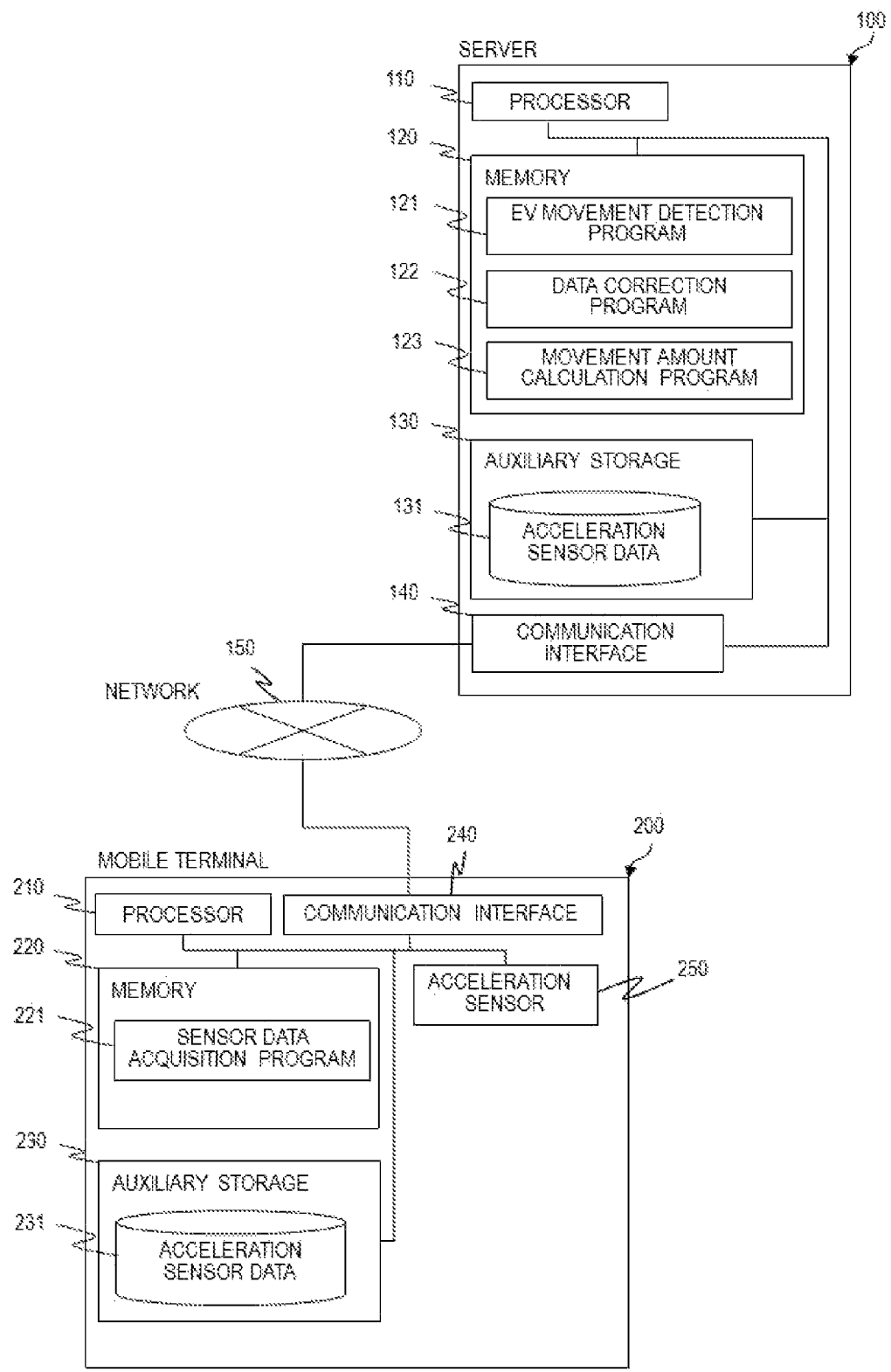
FIG. 1 is an explanatory diagram of a configuration of a movement amount estimation system according to a first embodiment of this invention.

FIG. 1 is an explanatory diagram of a configuration of the movement amount estimation system according to the first embodiment of this invention.

The movement amount estimation system includes a server 100 and the mobile terminal 200. The mobile terminal 200 includes an acceleration sensor 250 for detecting an acceleration generated by movement of the holder of the mobile terminal 200. The mobile terminal 200 stores acceleration sensor data 231 measured by the acceleration sensor 250. The server 100 collects the acceleration sensor data 231 measured by the acceleration sensor 250 of the mobile terminal 200 to estimate the movement amount of the holder based on the collected acceleration sensor data 231.

The mobile terminal 200 is first described. The mobile terminal 200 includes a processor 210, a memory 220, an auxiliary storage 230, a communication interface 240, and the acceleration sensor 250. The components described above are connected to each other by a bus. As the mobile terminal 200, a smartphone is conceivable, for example. However, the mobile terminal 200 is not limited to the smartphone as long as the acceleration of the movement of the holder can be measured by the acceleration sensor 250.

The processor 210 refers to the memory 220 to execute various computation processing. The memory 220 stores a sensor data acquisition program 221 therein. The sensor data acquisition program 221 enables an acceleration measured by the acceleration sensor 250 to be stored in association with a time at which the acceleration is measured so that the thus associated acceleration is stored as the acceleration sensor data 231 in the auxiliary storage 230.

The auxiliary storage 230 stores the acceleration sensor data 231. The auxiliary storage 230 is, for example, a portable storage medium. The acceleration sensor data 231 is described later in detail referring to FIG. 3.

The communication interface 240 is an interface for coupling the mobile terminal 200 to a network 150.

The acceleration sensor 250 is a sensor capable of detecting accelerations on three axes, specifically, a longitudinal direction, a lateral direction, and a height direction.

Next, the server 100 is described. The server 100 includes a processor 110, a memory 120, an auxiliary storage 130, and a communication interface 140. The above-mentioned components are connected to each other by a bus.

The processor 110 refers to the memory 120 to execute various computation processing. The memory 120 includes an elevator (EV) movement detection program 121, a data correction program 122, and a movement amount calculation program 123.

The EV movement detection program 121 detects a riding time period indicating a time period in which the holder moves using an elevator based on acceleration sensor data 131. The acceleration sensor data 131 corresponds to the acceleration sensor data 231 collected from the mobile terminal 200 and then stored in the auxiliary storage 130 of the server 100. The EV movement detection program 121 is described later in detail referring to FIG. 5.

The data correction program 122 corrects a movement velocity which is calculated by integrating the acceleration corresponding to the riding time period by the riding time period. The data correction program 122 is described later in detail referring to FIG. 6.

The movement amount calculation program 123 integrates the movement velocity corrected by the data correction program 122 by the riding time period to estimate a movement amount of the holder of the mobile terminal 200 when the holder uses the elevator.

The auxiliary storage 130 stores the acceleration sensor data 131 collected from the mobile terminal 200. Specifically, the server 100 periodically transmits an acceleration sensor data acquisition request to the mobile terminal 200 through the network 150. When receiving the acceleration sensor data acquisition request, the mobile terminal 200 transmits a non-transmitted piece of the acceleration sensor data 231 stored in the auxiliary storage 230 of the mobile terminal 200 itself to the server 100 through the network 150. When receiving the acceleration sensor data from the mobile terminal 200, the server 100 stores the received acceleration sensor data in the auxiliary storage 130.

A method in which the server 100 collects the acceleration sensor data 231 of the mobile terminal 200 is not limited to the above-mentioned one. The server 100 may directly read out the acceleration sensor data 231 from the portable storage medium in which the acceleration sensor data 231 of the mobile terminal 200 is stored.

The communication interface 140 is an interface for coupling the server 100 to the network 150.

The movement amount estimation system is a computer for executing the EV movement detection program 121, the data correction program 122, and the movement amount calculation program 123, and is not limited to the server 100. For example, if the mobile terminal 200 executes the EV movement detection program 121, the data correction program 122, and the movement amount calculation program 123 to calculate the movement amount of the holder when the holder uses the elevator, the mobile terminal 200 serves as the movement amount estimation system.

Figures 2, 3:
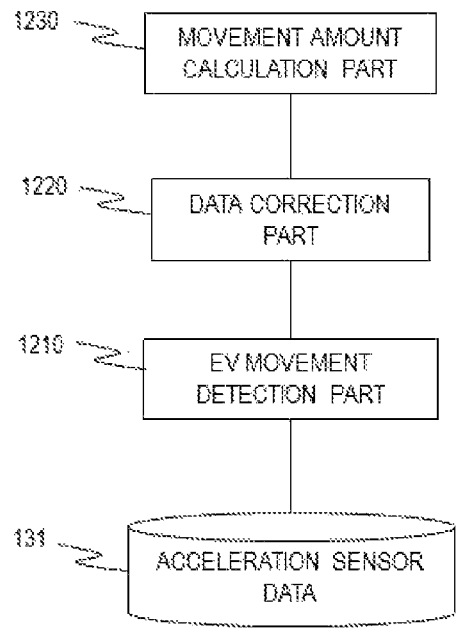
FIG. 2 is a functional block diagram of the movement amount estimation system according to the first embodiment of this invention.
FIG. 3 is an explanatory diagram of acceleration sensor data according to the first embodiment of this invention.

FIG. 2 is a functional block diagram of the movement amount estimation system according to the first embodiment of this invention.

An EV movement detection part 1210 detects the elevator riding time period of the holder of the mobile terminal 200 based on an increase and decrease of the acceleration indicated by the acceleration sensor data 131. The EV movement detection part 1210 is realized by the execution of the EV movement detection program 121 by the processor 110.

A data correction part 1220 corrects the movement velocity calculated by integrating the acceleration corresponding to the riding time period detected by the EV movement detection part 1210 so that the movement velocity at an end time of the riding time period matches the movement velocity at a start time of the riding time period. The data correction part 1220 is implemented by the execution of the data correction program 122 by the processor 110.

A movement amount calculation part 1230 integrates the movement velocity corrected by the data correction part 1220 by the riding time period to estimate the movement amount of the holder when the holder uses the elevator. The movement amount calculation part 1230 is implemented by the execution of the movement amount calculation program 123 by the processor 110.

FIG. 3 is an explanatory diagram of the acceleration sensor data 131 and the acceleration sensor data 231 (hereinafter referred to collectively as "acceleration sensor data") according to the first embodiment of this invention.

The acceleration sensor data contains a time 301, an acceleration X 302, an acceleration Y 303, and an acceleration Z 304.

A time at which the acceleration sensor data is measured is registered as the time 301. A lateral acceleration is registered as the acceleration X 302. A longitudinal acceleration is registered as the acceleration Y 303. An acceleration in a height direction is registered as the acceleration Z 304.

Figure 4:
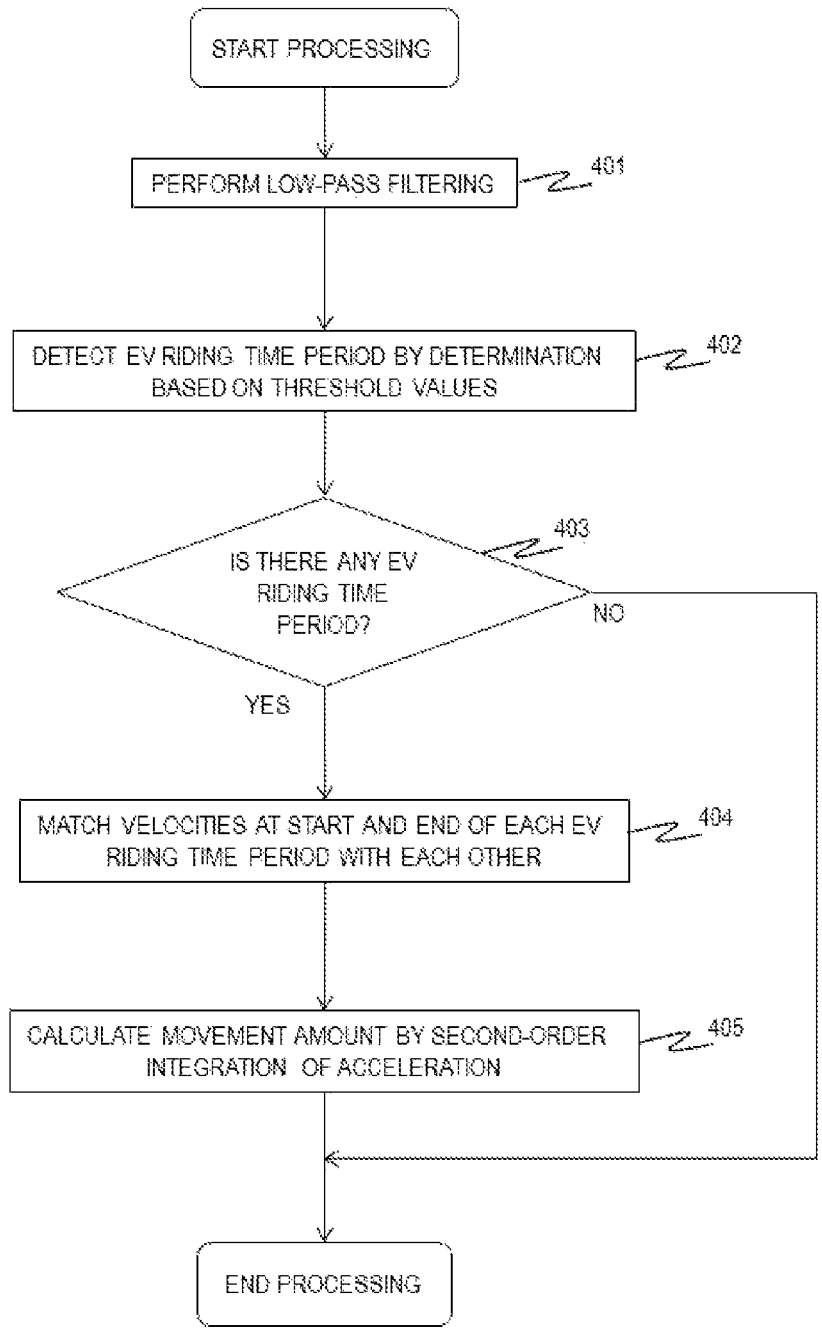
FIG. 4 is a flowchart of movement amount estimation processing according to the first embodiment of this invention.

FIG. 4 is a flowchart of movement amount estimation processing according to the first embodiment of this invention.

The movement amount estimation processing is executed by the processor 110 of the server 100.

First, the processor 110 calculates, as the acceleration data, an absolute value of the lateral acceleration registered as the acceleration X 302 of the acceleration sensor data 131, an absolute value of the longitudinal acceleration registered as the acceleration Y 303, and an absolute value of the acceleration in the height direction registered as the acceleration Z 304. Then, the processor 110 performs low-pass filtering on the calculated acceleration data (Step 401). The low-pass filtering is processing for eliminating an acceleration component in the height direction at a frequency equal to or higher than a predetermined frequency to allow the passage of only the acceleration in the height direction at a frequency lower than the predetermined frequency. Specifically, a frequency of the acceleration data generated by walking of the holder of the mobile terminal 200 is eliminated by the low-pass filtering. Alternatively, the processor 110 may extract only the acceleration in the height direction from the acceleration sensor data 131 and execute the low-pass filtering on the extracted acceleration in the height direction as the processing of Step 401, and then perform subsequent processing.

Next, the processor 110 detects the riding time period corresponding to a time period in which the holder of the mobile terminal 200 moves using the elevator based on the acceleration data which has been subjected to the low-pass filtering as the processing of Step 401 and preset threshold values (Step 402). The processing of Step 402 is performed by the execution of the EV movement detection program 121 by the processor 110. The processing of Step 402 is described later in detail referring to FIG. 5.

Next, the processor 110 determines whether or not the riding time period has been detected by the processing of Step 402 (Step 403).

When it is determined by the processing of Step 403 that the riding time period has not been detected by the processing of Step 402, it indicates that the holder of the mobile terminal 200 does not ride the elevator. Therefore, it is not necessary to estimate the movement amount of the holder of the mobile terminal 200 when the holder uses the elevator. Thus, the processing is terminated.

On the other hand, when it is determined by the processing of Step 403 that the riding time period has been detected by the processing of Step 402, the processor 110 integrates the acceleration data corresponding to the riding time period by the riding time period to calculate the movement velocity. Then, the processor 110 corrects the movement velocity at one of the start time and the end time of the riding time period based on another thereof (Step 404). The processing of Step 404 is performed by the execution of the data correction program 122 by the processor 110. The processing of Step 404 is described later in detail referring to FIG. 6.

Next, the processor 110 integrates the movement velocity corrected by the processing of Step 404 by the riding time period to calculate the movement amount of the holder of the mobile terminal 200 when the holder uses the elevator (Step 405). Then, the processing is terminated. The processing of Step 405 is performed by the execution of the movement amount calculation program by the processor 110.

In the manner described above, the movement velocity at one of the start time and the end time of the riding time period can be corrected based on another of the movement velocities so that the movement velocity at the start time of the riding time period and the movement velocity at the end time of the riding time period can match each other. The corrected movement velocity is integrated, and hence the movement amount of the holder when the holder uses the elevator can be calculated accurately.

Figure 5:
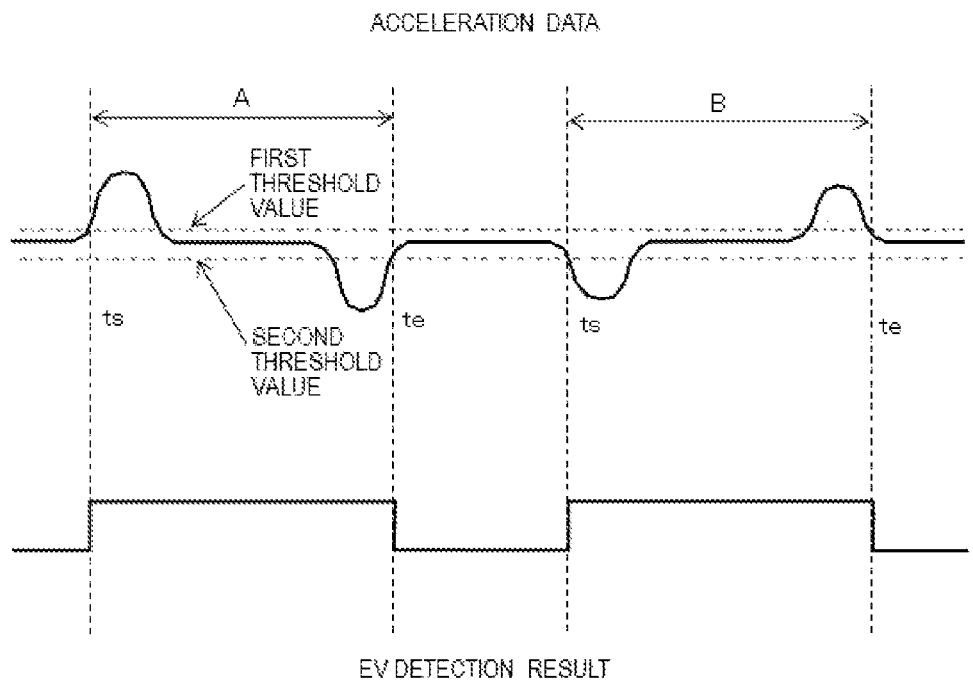
FIG. 5 is an explanatory diagram of riding time period detection processing by an EV movement detection program according to the first embodiment of this invention.

FIG. 5 is an explanatory diagram of the riding time period detection processing by the EV movement detection program 121 according to the first embodiment of this invention.

The elevator operates as follows. Specifically, after a person rides the elevator in a stopped state, the absolute value of the movement velocity of the elevator gradually increases. When the movement velocity reaches a given velocity, the elevator stops accelerating. Then, the elevator moves at the given movement velocity. When the elevator comes closer to a destination floor, the absolute value of the movement velocity of the elevator gradually decreases. After the elevator stops at the destination floor, the person exits the elevator.

Assuming that an upward direction is a positive direction, the acceleration data in the case where the holder of the mobile terminal 200 rides the elevator which moves up to a higher floor is as indicated in an interval A shown in FIG. 5.

When the acceleration data which is smaller than a first threshold value becomes equal to or larger than the first threshold value, the EV movement detection program 121 determines that the holder starts moving using the elevator and therefore sets the time at which the acceleration data becomes equal to or larger than the first threshold value as the start time (ts) of the elevator riding time period. On the other hand, when the acceleration data which is smaller than a second threshold value becomes equal to or larger than the second threshold value, the EV movement detection program 121 determines that the holder finishes moving using the elevator and therefore sets the time at which the acceleration data becomes equal to or larger than the second threshold value as the end time (te) of the elevator riding time period.

The first threshold value is preset to a value which is larger than a gravitational acceleration by a predetermined value, whereas the second threshold value is preset to a value which is smaller than the gravitational acceleration by the predetermined value. The first threshold value and the second threshold value may be different or may be the same.

Therefore, as the EV detection result in the interval A of FIG. 5 shows, the EV movement detection program 121 detects a time period from the start time (ts) to the end time (te) as a time period (riding time period) in which the holder moves using the elevator.

The acceleration data in the case where the holder of the mobile terminal 200 rides the elevator which moves down to a lower floor is as indicated in an interval B shown in FIG. 5, which is inverted to that in the interval A shown in FIG. 5.

When the acceleration data larger than the second threshold value becomes equal to or smaller than the second threshold value, the EV movement detection program 121 determines that the holder starts moving using the elevator and therefore sets the time at which the acceleration data becomes equal to or smaller than the second threshold value as the start time (ts) of the elevator riding time period. On the other hand, when the acceleration data larger than the first threshold value becomes equal to or smaller than the first threshold value, the EV movement detection program 121 determines that the holder finishes moving using the elevator and therefore sets the time at which the acceleration data becomes equal to or smaller than the first threshold value as the end time (te) of the elevator riding time period.

Therefore, as the EV detection result shown in the interval B of FIG. 5 shows, the EV movement detection program 121 detects the time period from the start time (ts) to the end time (te) as a time period (riding time period) in which the holder moves using the elevator.

As described above, the EV movement detection program 121 enables the detection of the elevator riding time period from the acceleration data based on the relationship between the increase and decrease of the acceleration data and the two threshold values.

Figure 6:
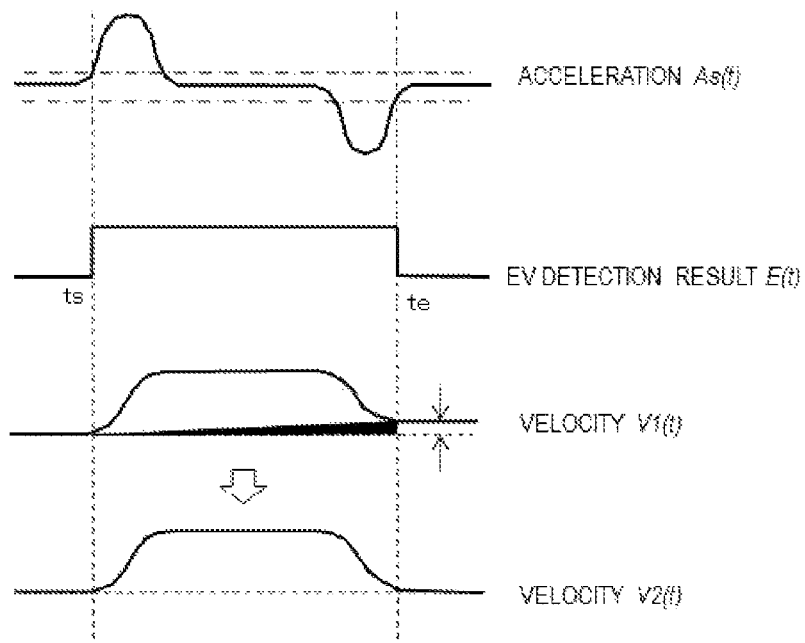
FIG. 6 is an explanatory diagram of data correction processing by a data correction program according to the first embodiment of this invention.

FIG. 6 is an explanatory diagram of data correction processing by the data correction program 122 according to the first embodiment of this invention.

A velocity V1(t) shown in FIG. 6 is calculated by integrating the acceleration data in the interval A shown in FIG. 5 by the riding time period. In principle, the elevator is in a stopped state at the start of movement and at the end of movement. Therefore, the movement velocity at the start of the movement of the elevator and that at the end of the movement of the elevator are both the same, specifically, 0. In the case of the velocity V1(t) shown in FIG. 6, however, the movement velocity at the start time (ts) of the riding time period and the movement velocity at the end time (te) are not the same, resulting in occurrence of an error.

The error may be attributed to a plurality of factors. For example, the EV movement detection program 121 detects the start time (ts) and the end time (te) of the riding time period based on the first threshold value and the second threshold value. Thus, the error may be attributed to the occurrence of an error between the start time (ts) and an actual movement start time or between the end time (te) and an actual movement end time of the elevator. Moreover, an error of the acceleration sensor 250 itself of the mobile terminal 200 may be considered as a factor of the error.

The data correction program 122 corrects the velocity V1(t) shown in FIG. 6 so that the movement velocity at the end time (te) matches the movement velocity at the start time (ts). A velocity obtained by correcting the velocity V1(t) is shown as a velocity V2(t) in FIG. 6. As indicated by the velocity V2(t) after the correction shown in FIG. 6, the movement velocity at the start time (ts) and the movement velocity at the end time (te) match each other. Here, "matching the movement velocities with each other" means setting the movement velocity at the end time (te) to be located within a predetermined range from the movement velocity at the start time (ts).

Although in FIG. 6, the data correction part 1220 corrects the movement velocity at the end time (te) so that the movement velocity at the end time (te) matches the movement velocity at the start time (ts), the data correction part 1220 may alternatively correct the movement velocity at the start time (ts) so that the movement velocity at the start time (ts) matches the movement velocity at the end time (te).

Further alternatively, paying attention to the fact that the movement velocity at the start of the movement of the elevator and the movement velocity at the end of the movement of the elevator are both 0 to be the same, the data correction part 1220 may specify one of the movement velocity at the start time (ts) and the movement velocity at the end time (te), which is the farther from 0, so that the specified movement velocity matches another of the movement velocities.

As described above, the server 100 of this embodiment integrates the movement velocity at which one of the movement velocity at the start time (ts) and the movement velocity at the end time (te) is matched with another of the movement velocities, thereby calculating the movement amount of the holder of the mobile terminal 200 when the holder uses the elevator. Thus, the movement amount of the holder using the elevator can be calculated accurately.

Second Embodiment

Now, a second embodiment of this invention is described referring to FIGS. 7 to 10.

In the first embodiment, the EV movement detection program 121 determines the start time (ts) and the end time (te) of the riding time period based on the first threshold value and the second threshold value. Therefore, a time later than the actual movement start time of the elevator is detected as the start time (ts), whereas a time earlier than the actual movement end time is detected as the end time (te). In the second embodiment, the detected start time (ts) is corrected to a time earlier than the detected start time based on a preset time period (correction parameter), whereas the detected end time (te) is corrected to a time later than the detected end time based on the preset time period. In this manner, the start time (ts) becomes closer to the movement start time, while the end time (te) becomes closer to the movement end time. As a result, the movement amount of the holder when the holder uses the elevator can be more accurately calculated.

Figure 7:
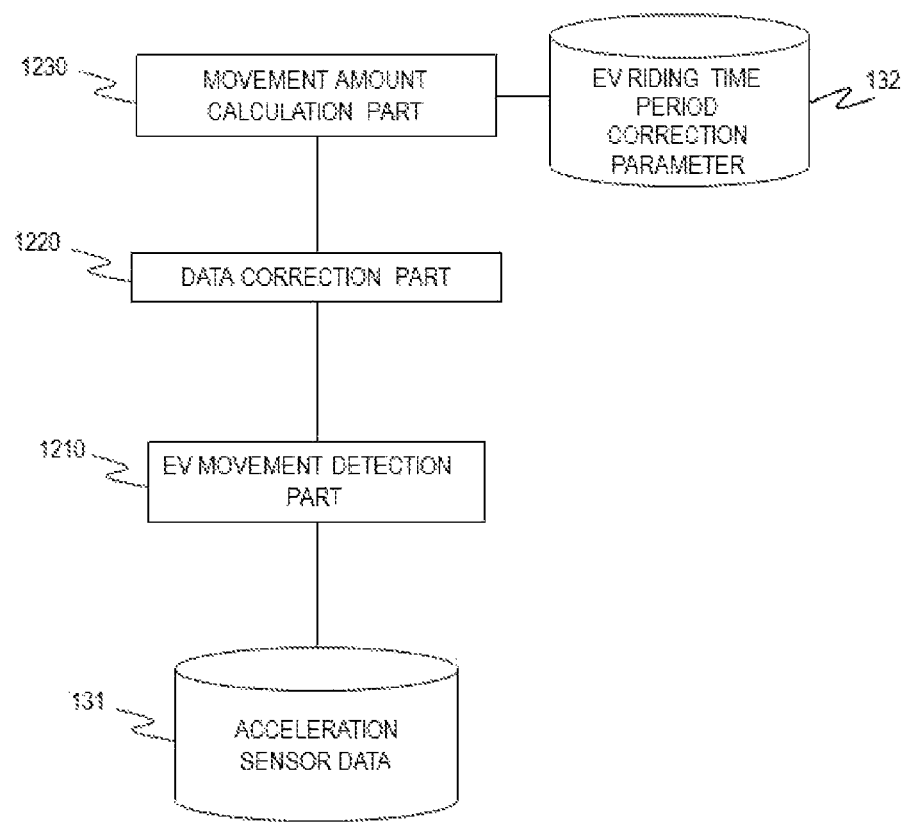
FIG. 7 is a functional block diagram of the movement amount estimation system according to a second embodiment of this invention.

FIG. 7 is a functional block diagram of the movement amount estimation system according to the second embodiment of this invention. Among the functional blocks illustrated in FIG. 7, the same functional blocks as those according to the first embodiment illustrated in FIG. 2 are denoted by the same reference symbols, and the description thereof is herein omitted.

The auxiliary storage 130 of the server 100 stores an EV riding time period correction parameter 132. As the EV riding time period correction parameter 132, a correction parameter is registered for each building in which an elevator is installed. The EV riding time period correction parameter 132 is described later in detail referring to FIG. 9.

The movement amount calculation part 1230 executes EV riding time period correction processing on the velocity corrected by the data correction part 1220. Specifically, the movement amount calculation part 1230 calculates a time obtained by subtracting the correction parameter corresponding to a building in which the holder of the mobile terminal 200 is located from the detected start time (ts) as a corrected start time and calculates a time obtained by adding the correction parameter to the detected end time (te) as a corrected end time. Then, the movement amount calculating part 1230 integrates the acceleration data from the corrected start time to the start time (ts) by a time period from the corrected start time to the start time (ts), thereby calculating a start-time velocity.

The movement velocity immediately after the start of the movement of the elevator and the movement velocity immediately before the end of the movement match each other. Therefore, the start-time velocity at the start time (ts) and an end-time velocity at the end time (te) match each other. Thus, the movement amount calculation part 1230 corrects the velocity corrected by the data correction part 1220 so that the velocity at the start time (ts) and the velocity at the end time (te) match the calculated start-time velocity. Then, the movement amount calculation part 1230 integrates the corrected movement velocity by the riding time period to calculate the movement amount of the holder when the holder uses the elevator.

FIG. 8 is a flowchart of the movement amount estimation processing according to the second embodiment of this invention. In the movement amount estimation processing illustrated in FIG. 8, the same processing steps as those of the movement amount estimation processing according to the first embodiment illustrated in FIG. 4 are denoted by the same step numbers, and the description thereof is herein omitted.

After the movement velocity is corrected by the processing of Step 404, the processor 110 executes the above-mentioned EV riding time period correction processing. Then, the processing proceeds to Step 405 where the movement velocity which has been subjected to the EV riding time period correction processing is integrated by the riding time period to calculate the movement amount of the holder when the holder uses the elevator.

FIG. 9 is an explanatory diagram of the EV riding time period correction parameter 132 according to the second embodiment of this invention.

The EV riding time period correction parameter 132 contains a building 901 and a correction parameter 902. As the building 901, identification information of the building in which the elevator is installed is registered. As the correction parameter 902, a time period to be subtracted from the start time (ts) is registered for each building. As the time period to be registered as the correction parameter 902, an administrator is desired to estimate a time period from the start of the movement of the elevator to a time at which the movement velocity reaches the first threshold value and the second threshold value and set the thus estimated time period.

In the EV riding time period correction parameter 132 shown in FIG. 9, the correction parameter is registered for each building. However, the correction parameter may alternatively be registered for each type of the elevator.

Figure 10:
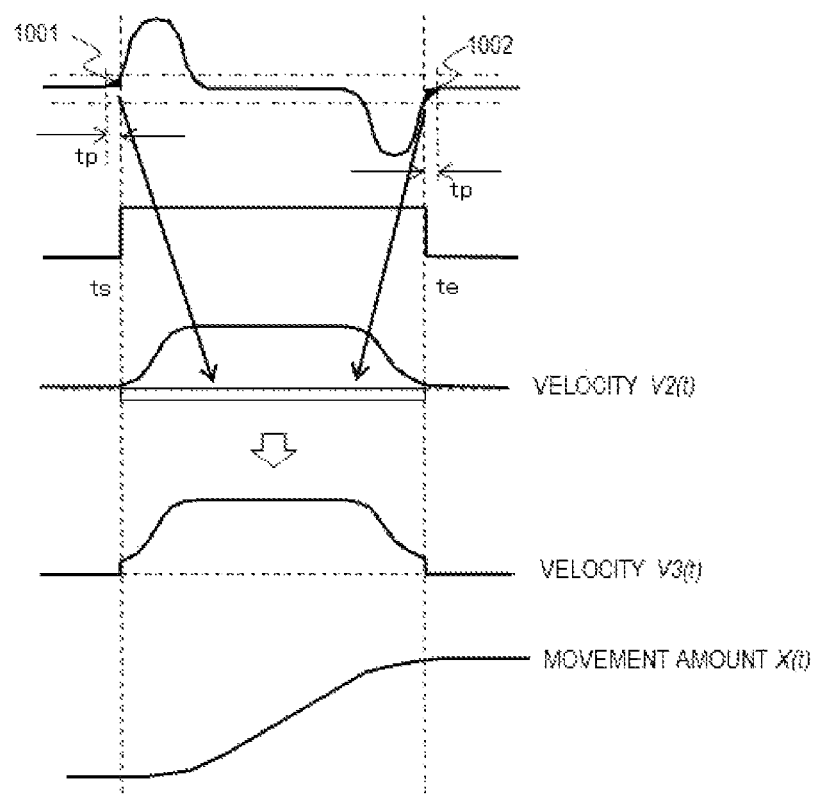
FIG. 10 is an explanatory diagram of EV riding time period correction processing according to the second embodiment of this invention.

FIG. 10 is an explanatory diagram of the EV riding time period correction processing according to the second embodiment of this invention.

The movement amount calculation part 1230 calculates a time obtained by subtracting a correction parameter (tp) from the start time (ts) as the corrected start time. Then, the movement amount calculation part 1230 integrates the acceleration data from the corrected start time to the start time (ts) by the correction parameter (tp) (time period from the corrected start time to the start time (ts)) to calculate the movement velocity of the elevator at the start time (ts) (start-time velocity) (indicated by a point 1001 shown in FIG. 10).

In this case, the movement velocity at the start of the movement of the elevator and the movement velocity at the end of the movement of the elevator are both 0 to be the same. Therefore, the movement velocity of the elevator at the end time (te) is considered to match the start-time velocity.

Thus, the movement amount calculation part 1230 adds the start-time velocity to the movement velocity V2(t) so that the movement velocity at the start time (ts) and the movement velocity at the end time (te) match the calculated start-time velocity of the movement velocity V2(t) obtained by the correction by the data correction part 1220, thereby calculating a movement velocity V3(t).

Then, the movement amount calculation part 1230 integrates the movement velocity V3(t) by the time period from the start time (ts) to the end time (te) to calculate a movement amount X(t).

By adding the start-time velocity to the movement velocity V(t), the movement velocity at the end time (te) matches the movement velocity at the start time (ts). Therefore, although only the calculation of the corrected start time is described above, the movement amount of the holder when the holder uses the elevator is substantially calculated in the following manner. Specifically, the start time (ts) is corrected based on the correction parameter to the corrected start time earlier than the start time, whereas the end time (te) is corrected based on the correction parameter to the corrected end time later than the end time. Then, the movement velocity is calculated by integrating the acceleration data from the corrected start time to the corrected end time. Based on the thus calculated movement velocity, the movement amount of the holder when the holder uses the elevator is calculated.

In this embodiment, the movement amount calculation part 1230 calculates the start-time velocity and adds the calculated start-time velocity to the movement velocity V2(t). Alternatively, the movement velocity V3(t) may also be calculated by calculating the movement velocity of the elevator at the end time (te) (end-time velocity; indicated by a point 1002 shown in FIG. 10) and then adding the calculated end-time velocity to the movement velocity V2(t). As the time period registered as the correction parameter 902 in this case, the administrator is desired to estimate the time period from the time at which the movement velocity reaches the first threshold value and the second threshold value to the stop of the movement of the elevator and set the thus estimated value.

A method of calculating the end-time velocity is described. First, the movement amount calculation part 1230 calculates the time obtained by adding the correction parameter (tp) to the end time (te) as the corrected end time. Then, the movement amount calculation part 1230 integrates the acceleration data from the end time (te) to the corrected end time by the correction parameter (tp) (time period from the end time (te) to the corrected end time) to calculate the movement velocity (end-time velocity) of the elevator at the end time (te) (indicated by the point 1002 shown in FIG. 10).

Moreover, although one of the start-time velocity and the end-time velocity is added to the movement velocity V2(t) in this embodiment, an average value of the start-time velocity and the end-time velocity may alternatively be added to the movement velocity V2(t).

Another method is further described. The movement amount calculation part 1230 integrates the acceleration data from the corrected start time to the corrected end time by the time period from the corrected start time to the corrected end time, thereby calculating the movement velocity. Then, the data correction part 1220 corrects one of the movement velocity at the corrected end time and the movement velocity at the corrected start time, which is calculated by the movement amount calculation part 1230, based on another of the movement velocities. Then, the movement amount calculation part 1230 may alternatively calculate the movement amount by integrating the movement velocity corrected by the data correction part 1220 by the time period from the corrected start time to the corrected end time. In this case, a value of the correction parameter for calculating the corrected start time and a value of the correction parameter for calculating the corrected end time may be different from each other.

As described above, in this embodiment, the start time (ts) and the end time (te), which are detected by the EV movement detection part 1210, can become closer to the actual movement start time and the actual movement end time of the elevator, respectively. Therefore, the movement amount of the holder of the mobile terminal 200 when the holder uses the elevator can be calculated accurately.

Third Embodiment

Figure 11:
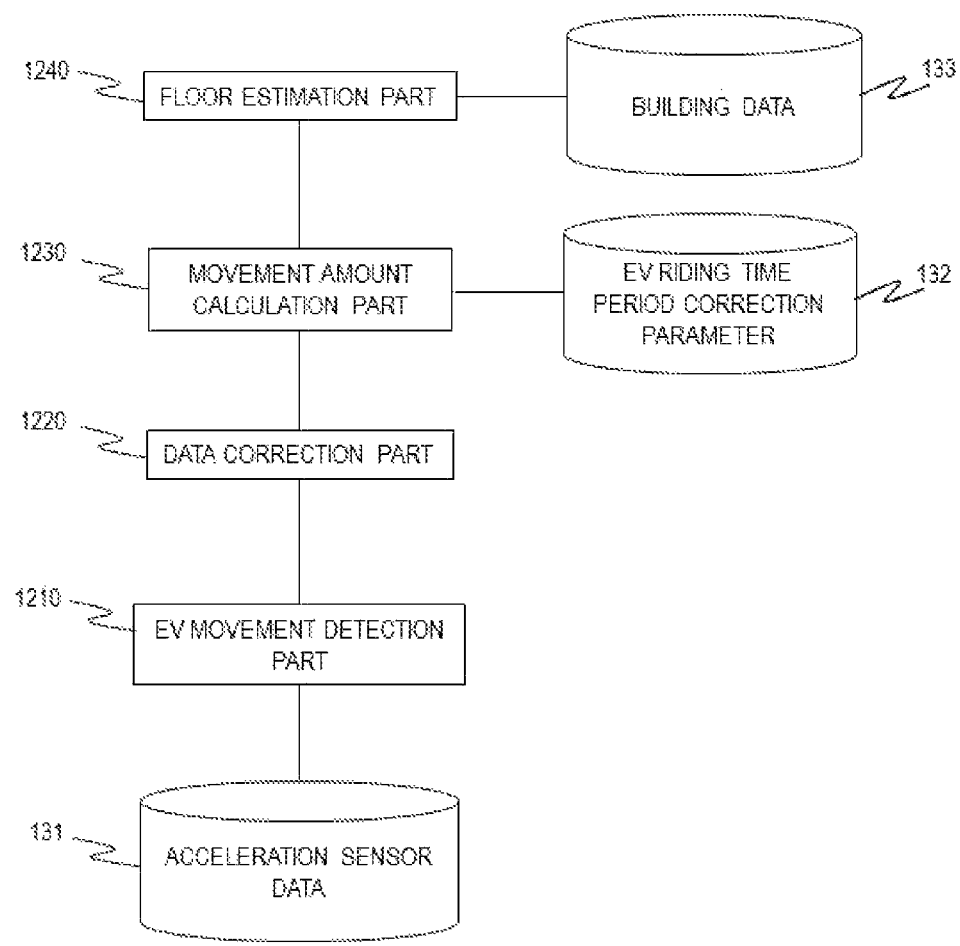
FIG. 11 is a functional block diagram of the movement amount estimation system according to the third embodiment of this invention.
Figures 12, 13:
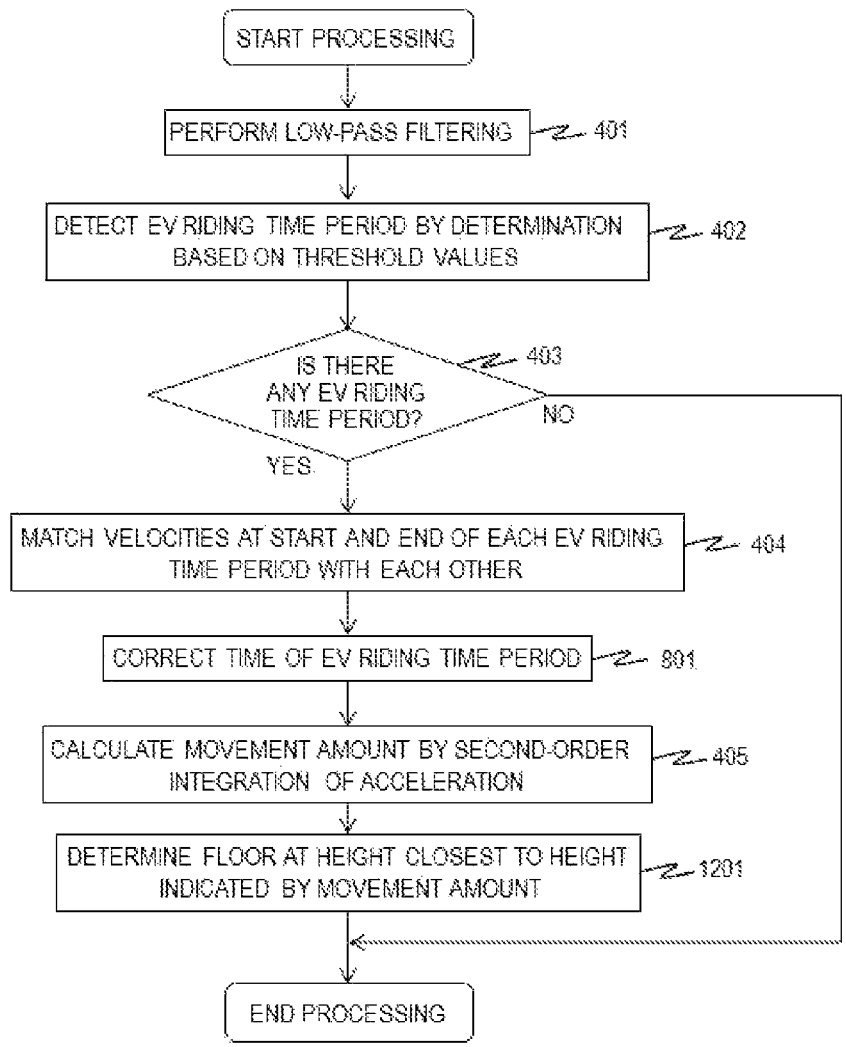
FIG. 12 is a flowchart of the movement amount estimation processing according to a third embodiment of this invention.
FIG. 13 is an explanatory diagram of building data according to the third embodiment of this invention.

Now, a third embodiment of this invention is described referring to FIGS. 11 to 13.

In this embodiment, a floor estimation part 1240, which is illustrated in FIG. 11, estimates a floor on which the holder of the mobile terminal 200 is located based on the movement amount of the holder of the mobile terminal 200 when the holder uses the elevator, which is calculated by the movement amount calculation part 1230. The third embodiment is applicable to the first embodiment and the second embodiment.

FIG. 11 is a functional block diagram of the movement amount estimation system according to the third embodiment of this invention. Among the functional blocks illustrated in FIG. 11, the same functional blocks as those according to the first embodiment illustrated in FIG. 2 and those according to the second embodiment illustrated in FIG. 7 are denoted by the same reference symbols, and the description thereof is herein omitted.

The auxiliary storage 130 of the server 100 stores building data 133. As the building data 133, floors of a building and a height of each of the floors are registered. The building data 133 is described later in detail referring to FIG. 13.

The floor estimation part 1240 adds the movement amount calculated by the movement amount calculation part 1230 to a total movement amount before the calculation of the movement amount to calculate a height at which the holder is located after the movement. Then, the floor estimation part 1240 estimates a floor located at the height which is the closest to the calculated height as a floor to which the holder has moved.

The floor estimation part 1240 is implemented by the execution of a floor estimation program (not shown), which is stored in the memory 120, by the processor 110.

The acceleration data when the elevator moves up is as shown in the interval A of FIG. 5, whereas the acceleration data when the elevator moves down is inverted to the acceleration data shown in the interval A of FIG. 5. Therefore, the movement amount when the elevator moves up has a positive value, whereas the movement amount when the elevator moves down has a negative valve. Therefore, by adding the calculated movement amount to the total movement amount, the height at which the holder is located after the movement in consideration of the vertical movement of the elevator is calculated.

FIG. 12 is a flowchart of the movement amount estimation processing according to the third embodiment of this invention. In the movement amount estimation processing illustrated in FIG. 12, the same processing steps as those of the movement amount estimation processing according to the first embodiment illustrated in FIG. 4 and the movement amount estimation processing according to the second embodiment illustrated in FIG. 7 are denoted by the same step numbers, and the description thereof is herein omitted.

After executing the processing of Step 405, the processor 110 adds the movement amount calculated by the processing of Step 405 to the total movement amount and refers to the building data 133 to estimate the floor located at the height which is the closest to the height indicated by the total movement amount after the addition, at which the holder of the mobile terminal 200 is located (Step 1201). Then, the movement amount estimation processing is terminated.

FIG. 13 is an explanatory diagram of the building data 133 according to the third embodiment of this invention.

The building data 133 contains a building 1301, a floor 1302, and a height 1303. As the building 1301, building identification information is registered. As the floor 1302, floor identification information is registered. As the height 1303, the height of each floor is registered.

Although the case where the third embodiment is applied to the second embodiment has been described, the third embodiment may also be applied to the first embodiment.

As described above, according to the third embodiment, the floor on which the holder of the mobile terminal 200 is located can be estimated.

Fourth Embodiment

Figure 14:
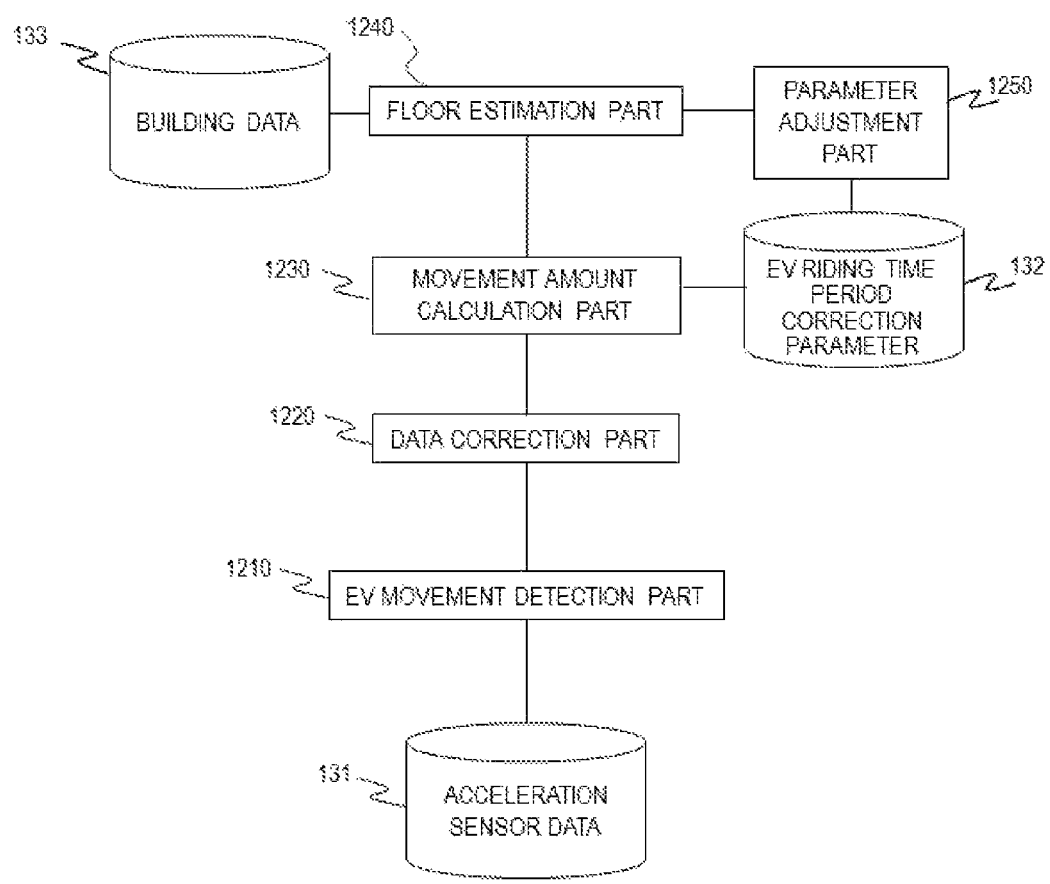
FIG. 14 is a functional block diagram of the movement amount estimation system according to a fourth embodiment of this invention.
Figure 15:
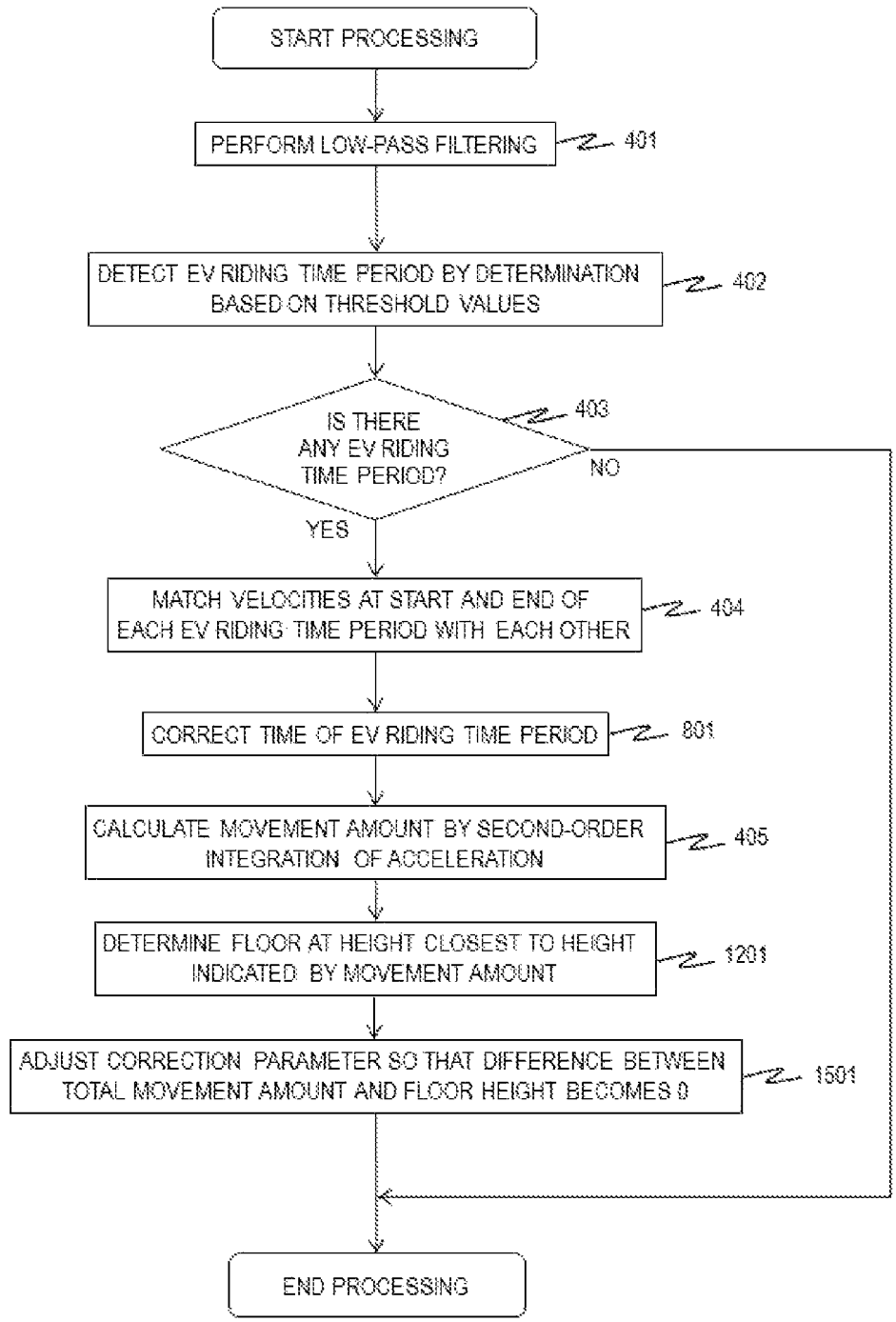
FIG. 15 is a flowchart of the movement amount estimation processing according to the fourth embodiment of this invention.

Now, a fourth embodiment of this invention is described referring to FIGS. 14 and 15.

The fourth embodiment is applicable to the third embodiment. In this embodiment, the correction parameter is adjusted so that the height at which the holder is located matches the height of the floor estimated by the floor estimation part 1240. By calculating the movement amount by using the adjusted correction parameter, the movement amount of the holder when using the elevator can be more accurately calculated.

FIG. 14 is a functional block diagram of the movement amount estimation system according to the fourth embodiment of this invention. Among the functional blocks illustrated in FIG. 14, the same functional blocks as those according to the third embodiment illustrated in FIG. 11 are denoted by the same reference symbols, and the description thereof is herein omitted.

The floor estimation part 1240 notifies a parameter adjustment part 1250 of the calculated total movement amount and the estimated floor. The parameter adjustment part 1250 adjusts the correction parameter so that a difference between the calculated total movement amount and the height of the estimated floor becomes 0.

Specifically, the parameter adjustment part 1250 calculates a target movement amount by subtracting the total movement amount before the addition of the movement amount calculated by the movement amount calculation part 1230 from the height of the floor estimated by the floor estimation part 1240. Then, the parameter adjustment part 1250 adjusts the correction parameter so that the movement amount calculated by the movement amount calculation part 1230 matches the calculated target movement amount. For example, when the target movement amount is larger than the movement amount calculated by the movement amount calculation part 1230, the parameter adjustment part 1250 adjusts the correction parameter so as to be larger than the correction parameter which is used to calculate the movement amount. On the other hand, when the target movement amount is smaller than the movement amount calculated by the movement amount calculation part 1230, the parameter adjustment part 1250 adjusts the correction parameter so as to be smaller than the correction parameter which is used to calculate the movement amount.

The parameter adjustment part 1250 is implemented by the execution of a parameter adjustment program (not shown), which is stored in the memory 120, by the processor 110.

FIG. 15 is a flowchart of the movement amount estimation processing according to the fourth embodiment of this invention.

After executing the processing of Step 1201, the processor 110 adjusts the correction parameter so that a difference between the total movement amount calculated by the processing of Step 1201 and the height of the floor estimated by the processing of Step 1201 becomes 0 (Step 1501). Then, the movement amount estimation processing is terminated.

Specifically, the processor 110 calculates the target movement amount by subtracting the total movement amount before the movement amount calculated by the processing of Step 405 is added in the processing of Step 1201 from the height of the floor estimated by the processing of Step 1201. Then, the processor 110 adjusts the correction parameter so that the movement amount calculated by the processing of Step 405 matches the target movement amount. Although in the processing of Step 1501, the correction parameter is adjusted so that the difference between the total movement amount calculated by the processing of Step 1201 and the height of the floor estimated by the processing of Step 1201 becomes 0, the correction parameter may also be adjusted so that the difference between the total movement amount calculated by the processing of Step 1201 and the height of the floor estimated by the processing of Step 1201 falls within a predetermined range.

By the processing described above, the correction parameter is adjusted so that the total movement amount and the height of the floor estimated by the floor estimation part 1240 match each other. Therefore, the movement amount of the holder when the holder uses the elevator can be more accurately calculated.

Fifth Embodiment

Figure 16:
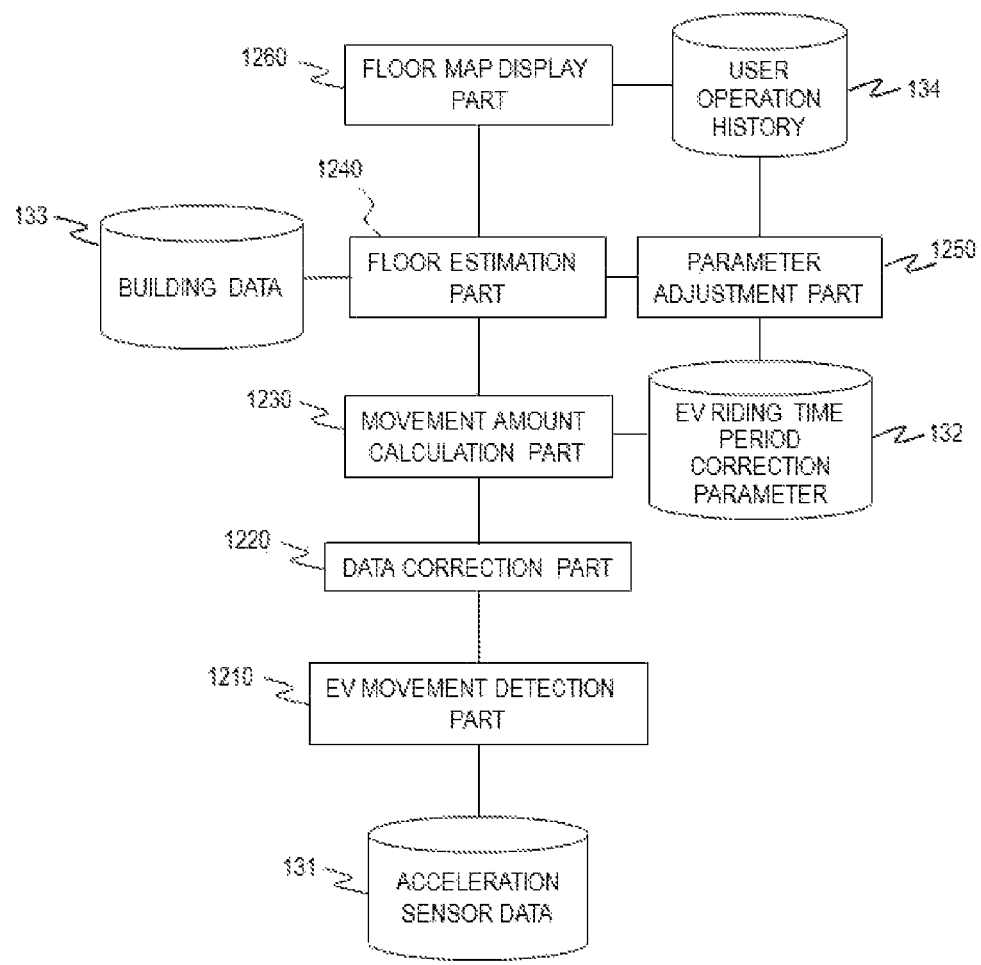
FIG. 16 is a functional block diagram of the movement amount estimation system according to a fifth embodiment of this invention.
Figure 17:
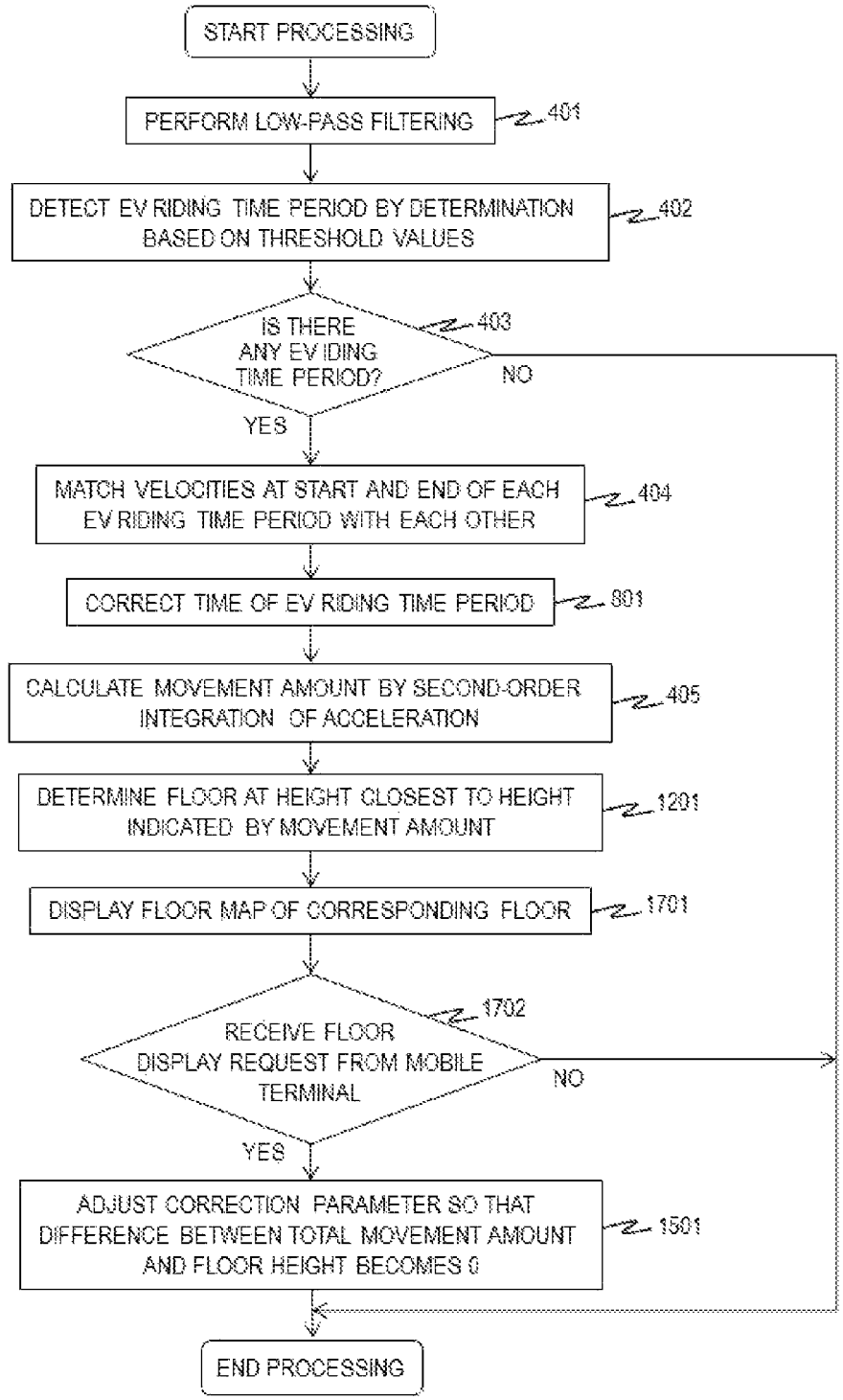
FIG. 17 is a flowchart of the movement amount estimation processing according to the fifth embodiment of this invention.

Now, a fifth embodiment of this invention is described referring to FIGS. 16 and 17.

In the fifth embodiment, the server 100 displays a floor map corresponding to the floor estimated based on the total movement amount on a display part (not shown) of the mobile terminal 200. Then, it is determined whether or not the floor estimated based on the operation by the holder of the mobile terminal 200 is a correct floor. When the estimated floor is not a correct floor, the correction parameter is adjusted so that a height of the correct floor and the total movement amount match each other. The fifth embodiment is applicable to the third embodiment.

FIG. 16 is a functional block diagram of the movement amount estimation system according to the fifth embodiment of this invention. Among the functional blocks illustrated in FIG. 16, the same functional blocks as those according to the third embodiment illustrated in FIG. 11 are denoted by the same reference symbols, and the description thereof is herein omitted.

The auxiliary storage 130 of the server 100 stores a user operation history 134 in which information relating to the operation performed by the holder of the mobile terminal 200 is registered.

A floor-map display part 1260 transmits floor-map display information corresponding to the floor estimated by the floor estimation part 1240 to the mobile terminal 200 through the network 150. When receiving the floor-map display information, the mobile terminal 200 displays a floor map corresponding to the floor-map display information on the display part (not shown). When the displayed floor map is not a floor map of the floor on which the holder is currently located, the holder of the mobile terminal 200 operates the mobile terminal 200 to transmit a display request of the floor map of the floor on which the holder is currently located to the server 100. When the server 100 receives the display request, the floor-map display part 1260 stores the floor which is requested to be displayed in the user operation history 134. Then, determining that the estimated floor is different from the floor on which the holder is currently located, the floor-map display part 1260 notifies the parameter adjustment part 1250 of the floor on which the holder is currently located. The floor-map display part 1260 is realized by the execution of a floor-map display program, which is stored in the memory 120, by the processor 110.

The parameter adjustment part 1250 adjusts the correction parameter so that the total movement amount and the height of the notified floor on which the holder is currently located match each other.

FIG. 17 is a flowchart of the movement amount estimation processing according to the fifth embodiment of this invention.

After executing the processing of Step 1201, the processor 110 transmits the display information of the floor map corresponding to the floor estimated by the processing of Step 1201 to the mobile terminal 200 through the network 150, thereby displaying the floor map corresponding to the floor estimated by the processing of Step 1201 on the mobile terminal 200 (Step 1701).

Next, the processor 110 determines whether or not a display request for the floor map of a floor which is different from the floor map displayed on the mobile terminal 200 has been received from the mobile terminal 200 (Step 1702). The display request contains an indication of a floor which is desired to be displayed on the mobile terminal 200.

Specifically, the processor 110 determines whether or not the display request has been received within a predetermined time period from the transmission of the display information of the floor map by the processing of Step 1701.

When it is determined by the processing of Step 1702 that the display request has not been received within the predetermined time period from the transmission of the display information of the floor map by the processing of Step 1701, the floor estimated by the processing of Step 1201 and the floor on which the holder is currently located match each other. Therefore, the processor 110 terminates the processing.

On the other hand, when it is determined by the processing of Step S1702 that the display request has been received within the predetermined time period from the transmission of the display information of the floor map by the processing of Step 1701, the floor estimated by the processing of Step 1201 and the floor on which the holder is currently located do not match each other. Therefore, the processing performed by the processor 110 proceeds to Step 1501 where the correction parameter is adjusted so that the total movement amount and the height of the floor contained in the received display request match each other. Then, the processing is terminated.

Specifically, the processor 110 refers to the building data 133 to specify the height of the floor, which is contained in the received display request. Then, the processor 110 adjusts the correction parameter so that the total movement amount and the specified height match each other. Specific processing for adjusting the correction parameter is the same as the processing of Step 1501 illustrated in FIG. 15, and therefore the description thereof is herein omitted.

By the processing described above, the correction parameter is adjusted only when the total movement amount and the height at which the holder is actually located are different by a predetermined value (height corresponding to one floor) or more. Therefore, the correction parameter can be prevented from being erroneously adjusted, while the movement amount can be calculated accurately.

Sixth Embodiment

Figure 18:
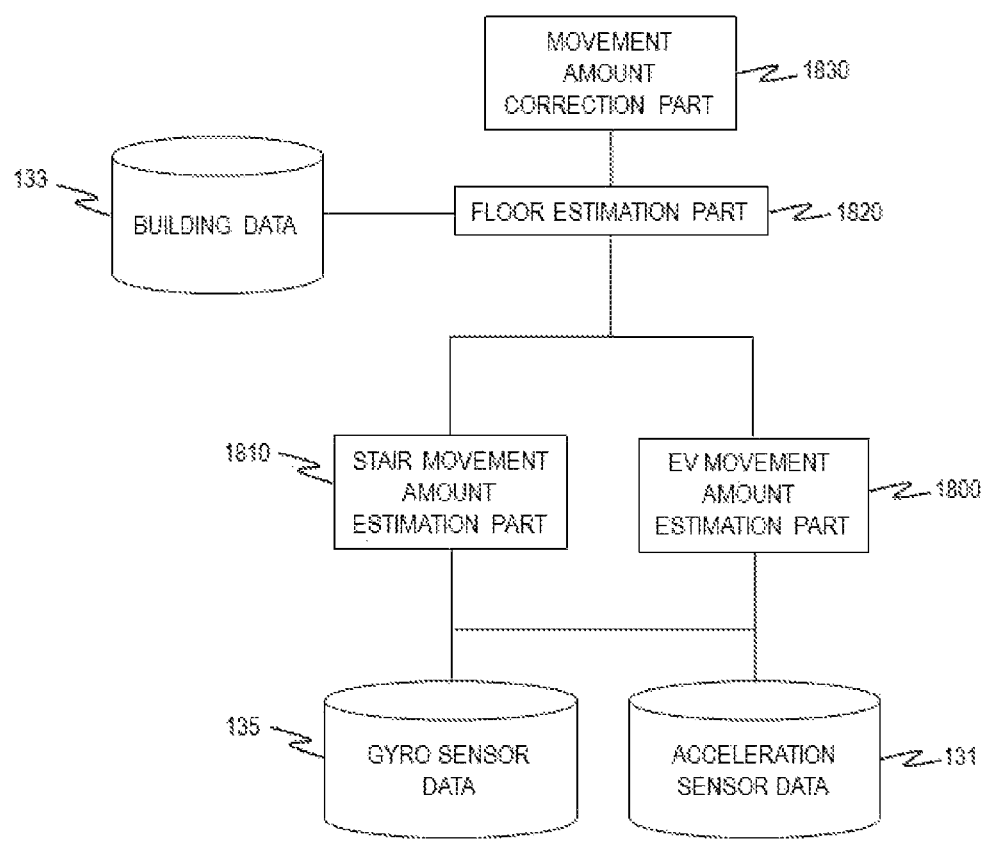
FIG. 18 is a functional block diagram of the movement amount estimation system according to a sixth embodiment of this invention.

Now, a sixth embodiment of this invention is described referring to FIG. 18.

The sixth embodiment is briefly described.

A movement amount estimation system according to the sixth embodiment calculates a movement amount of the holder of the mobile terminal 200 on stairs (stair movement amount) in addition to the movement amount of the holder of the mobile terminal 200 when the holder uses the elevator (elevator movement amount). Then, the movement amount estimation system calculates at least one of a total upward movement amount, which is the sum of an upward elevator movement amount and an upward stair movement amount, or a total downward movement amount, which is the sum of a downward elevator movement amount and a downward stair movement amount. For simplification of the description, it is herein supposed that at least the total upward movement amount is calculated.

Next, the movement amount estimation system refers to the building data 133 to specify the height of the floor, which is the closest to the calculated total upward movement amount. When the calculated total upward movement amount and the specified height of the floor do not match each other, the movement amount estimation system adjusts the stair movement amount to match the total upward movement amount after the adjustment of the stair movement amount and the height of the floor with each other.

In the above-mentioned manner, the stair movement amount, which is likely to contain a calculation error, can be adjusted to an appropriate stair movement amount.

FIG. 18 is a functional block diagram of the movement amount estimation system according to the sixth embodiment of this invention. Among the functional blocks of the movement amount estimation system illustrated in FIG. 18, the EV movement detection part 1210, the data correction part 1220, and the movement amount calculation part 1230, which are illustrated in FIG. 2 according to the first embodiment, are illustrated collectively as an EV movement amount estimation part 1800. The building data 133 is the same as the building data 133 illustrated in FIG. 13 according to the third embodiment, and therefore the description thereof is herein omitted.

The mobile terminal 200 according to the sixth embodiment includes a gyro sensor (not shown). The gyro sensor detects an angle or an angular velocity of the mobile terminal 200 so as to detect a relative movement direction of the holder of the mobile terminal 200.

The sensor data acquisition program 221 of the mobile terminal 200 acquires the result of detection by the gyro sensor, associates the acquired result of detection by the gyro sensor and a detection time with each other, and stores the thus associated data as gyro sensor data (not shown) in the auxiliary storage 230. The server 100 acquires the gyro sensor data from the mobile terminal 200 to store the acquired gyro sensor data in its own auxiliary storage 130 as gyro sensor data 135.

The server 100 includes the EV movement amount estimation part 1800, a stair movement amount estimation part 1810, a floor estimation part 1820, and a movement amount correction part 1830. The stair movement amount estimation part 1810 is implemented by the execution of a stair movement amount estimation program (not shown), which is stored in the memory 120, by the processor 110. The floor estimation part 1820 is implemented by the execution of a floor estimation program (not shown), which is stored in the memory 120, by the processor 110. The movement amount correction part 1830 is implemented by the execution of a movement amount correction program (not shown), which is stored in the memory 120, by the processor 110.

The stair movement amount estimation part 1810 detects a time period (stair movement time period) in which the holder of the mobile terminal 200 moves taking the stairs based at least on the acceleration sensor data 131 and integrates the acceleration of the stair movement time period in the height direction twice, thereby calculating the stair movement amount. For example, by using the technology disclosed in JP 2006-170879 A, the stair movement time period may be detected based on the acceleration sensor data 131. Alternatively, based on the gyro sensor data 135 and the acceleration sensor data 131, the stair movement amount estimation part 1810 may detect a time at which the acceleration in the height direction becomes equal to or larger than a predetermined value and the gyro sensor data 135 becomes equal to or larger than a predetermined angle as a start time of the upward stair movement time period and detect a time at which the acceleration in the height direction becomes equal to or smaller than the predetermined value and the gyro sensor data 135 becomes equal to or larger than the predetermined angle as an end time of the upward stair movement time period. Based on the gyro sensor data 135 and the acceleration sensor data 131, the stair movement amount estimation part 1810 may also detect a time at which the acceleration in the height direction becomes equal to or smaller than the predetermined value and the gyro sensor data 135 becomes equal to or larger than the predetermined angle as a start time of the downward stair movement time period and detect a time at which the acceleration in the height direction becomes equal to or larger than the predetermined value and the gyro sensor data 135 becomes equal to or larger than the predetermined angle as an end time of the downward stair movement time period.

The stair movement amount estimation part 1810 detects the stair movement time period based on the acceleration containing a component of a walking period without performing low-pass filtering on the acceleration sensor data 131. Therefore, a time period in which the holder moves without taking the stairs is likely to be erroneously detected as the stair movement amount time period. Thus, the stair movement amount is likely to contain an error.

Assuming that the upward direction is positive, both the acceleration and the stair movement amount respectively have positive values when the holder of the mobile terminal 200 moves to a higher floor by taking the stairs. On the other hand, when the holder of the mobile terminal 200 moves to a lower floor by taking the stairs, both the acceleration and the stair movement amount respectively have negative values. Therefore, whether the stair movement amount is the upward stair movement amount or the downward stair movement can be determined by determining a sign (positive or negative) of the stair movement amount.

The floor estimation part 1820 calculates at least one of a total upward movement amount or a total downward movement amount. The total upward movement amount is the sum of the upward stair movement amount calculated by the stair movement amount estimation part 1810 and the upward elevator movement amount calculated by the EV movement amount estimation part 1800. Similarly, the total downward movement amount is the sum of the downward stair movement amount calculated by the stair movement amount estimation part 1810 and the downward elevator movement amount calculated by the EV movement amount estimation part 1800. Then, the floor estimation part 1820 refers to the building data 133 to specify the height of the floor, which is the closest to the calculated total movement amount.

When the height of the floor, which is specified by the floor estimation part 1820, and the calculated total movement amount do not match each other, the movement amount correction part 1830 adjusts the stair movement amount so that the total movement amount matches the height of the floor, which is specified by the floor estimation part 1820.

In the manner described above, the stair movement amount, which is likely to contain an error, can be adjusted to an accurate value.

The processing described above is described by way of a specific example.

For example, the following case is described. Specifically, the building data 133 is the building data shown in FIG. 13, and the holder of the mobile terminal 200 uses the elevator to move from the first floor to the second floor and takes the stairs to move from the second floor to the third floor.

It is assumed that the EV movement amount estimation part 1800 calculates 4 meters as the upward elevator movement amount and the stair movement amount estimation part 1810 calculates 3 meters as the upward stair movement amount. In this case, the floor estimation part 1820 calculates 7 meters (4 meters+3 meters) as the total upward movement amount. The floor estimation part 1820 refers to the building data 133 to specify the floor height as 8 meters.

The total upward movement amount (7 meters) and the floor height (8 meters) do not match each other. Therefore, next, the movement amount correction part 1830 adjusts the upward stair movement amount (3 meters) to 4 meters. As a result, the total upward movement amount (8 meters=4 meters+4 meters) after the adjustment of the upward stair movement amount matches the floor height (8 meters). Therefore, the error of the upward stair movement amount is adjusted.

In this embodiment, the floor height is specified for each of the total upward movement amount and the total downward movement amount. Therefore, this embodiment is applicable even to the case where the floor from which the holder of the mobile terminal 200 enters the building differs from the floor from which the holder exits the building.

Next, a variation of the sixth embodiment is described.

The variation of the sixth embodiment presupposes that the floor from which the holder of the mobile terminal 200 enters the building is the same as the floor from which the holder exits the building. When the total upward movement amount and the total downward movement amount are different from each other, the floor height is specified from at least one of the total upward movement amount or the total downward movement amount. Then, the stair movement amount of a first total movement amount, which is farther from the specified floor height, is adjusted so as to match a second total movement amount, which is closer to the specified floor.

In the manner described above, the stair movement amount of the total movement amount, which is supposed to contain a larger error, can be adjusted to an accurate value.

The variation of the sixth embodiment is described below referring to FIG. 18.

The floor estimation part 1820 calculates the total upward movement amount, which is the sum of the upward stair movement amount and the upward elevator movement amount, and the total downward movement amount, which is the sum of the downward stair movement amount and the downward elevator movement amount. Then, when the total upward movement amount and the total downward movement amount are different from each other, the floor estimation part 1820 refers to the building data 133 to specify the height of the floor closest to at least one of the total upward movement amount or the total downward movement amount.

The movement amount correction part 1830 selects the farther one of the total upward movement amount and the total downward movement amount from the floor height, which is specified by the floor estimation part 1820, as the first total movement amount and another thereof as the second total movement amount. Then, the movement amount correction part 1830 adjusts the stair movement amount of the first total movement amount so that the first total movement amount and the second total movement amount match each other.

Seventh Embodiment

Figure 19:
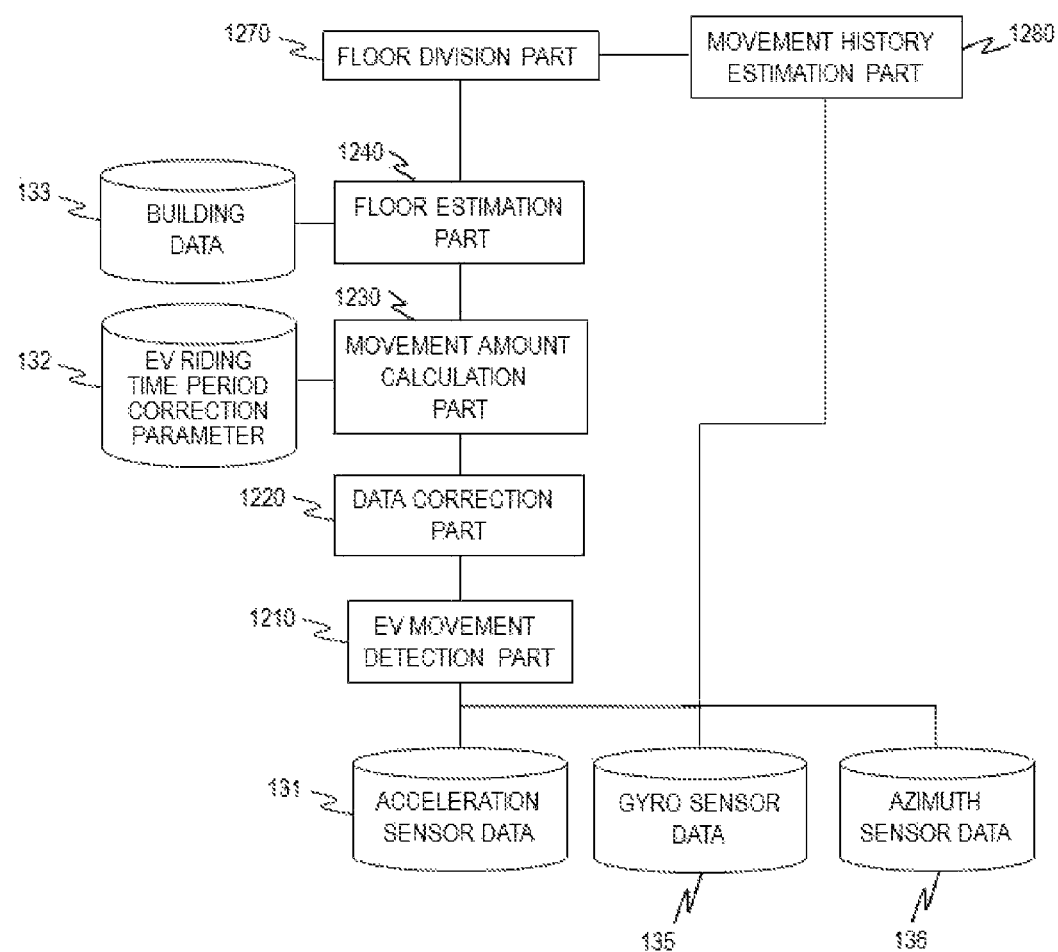
FIG. 19 is a functional block diagram of the movement amount estimation system according to a seventh embodiment of this invention.

Now, a seventh embodiment of this invention is described referring to FIG. 19.

In the seventh embodiment, a horizontal movement history of the holder of the mobile terminal 200 over a floor stay time period and a floor estimated based on the movement amount of the movement for the elevator riding time period corresponding to the end time (te) are associated with each other. The floor stay time period indicates a time period from the detection of the end time (te) of the elevator riding time period by the EV movement detection part 1210 to the subsequent detection of the start time (ts) of the elevator riding time period. In this manner, a movement locus of the holder for each floor on which the holder of the mobile terminal 200 has stayed can be specified. This embodiment is applicable to the third embodiment.

FIG. 19 is a functional block diagram of the movement amount estimation system according to the seventh embodiment of this invention. Among the functional blocks illustrated in FIG. 19, the same functional blocks as those according to the third embodiment illustrated in FIG. 11 are denoted by the same reference symbols, and the description thereof is herein omitted.

The mobile terminal 200 of this embodiment includes a gyro sensor and an azimuth sensor (both not shown). The gyro sensor detects the angle or the angular velocity of the mobile terminal 200 so as to detect the relative movement direction of the holder of the mobile terminal 200. The azimuth sensor detects an angle of the mobile terminal 200 with respect to a certain direction.

The sensor data acquisition program 221 of the mobile terminal 200 acquires the result of detection by the gyro sensor, associates the acquired result of detection by the gyro sensor and the detection time with each other, and stores the thus associated data as the gyro sensor data (not shown) in the auxiliary storage 230. The sensor data acquisition program 221 of the mobile terminal 200 acquires the result of detection by the azimuth sensor, associates the acquired result of detection and a detection time with each other, and stores the associated data as azimuth sensor data (not shown) in the auxiliary storage 230.

The server 100 acquires the gyro sensor data and the azimuth sensor data from the mobile terminal 200 and stores the thus acquired gyro sensor data and azimuth sensor data as the gyro sensor data 135 and azimuth sensor data 136 in its own auxiliary storage 130.

The server 100 includes a floor division part 1270 and a movement history estimation part 1280. The floor division part 1270 is implemented by the execution of a floor division program (not shown), which is stored in the memory 120, by the processor 110. The movement history estimation part 1280 is implemented by the execution of a movement history estimation program (not shown), which is stored in the memory 120, by the processor 110.

First, the movement history estimation part 1280 is described.

The movement history estimation part 1280 estimates the horizontal movement history of the holder of the mobile terminal 200 based on the acceleration sensor data 131, the gyro sensor data 135, and the azimuth sensor data 136. Specifically, the movement history estimation part 1280 calculates a horizontal travel distance based on the acceleration sensor data 131 while calculating a traveling direction of the holder of the mobile terminal 200 based on the gyro sensor data 135 and the azimuth sensor data 136. The movement history estimation part 1280 associates the calculated travel distance and the calculated traveling direction with each other based on the time. In this manner, the movement history estimation part 1280 estimates a movement history of the holder of the mobile terminal 200.

Next, the floor division part 1270 is described.

The floor division part 1270 specifies the floor stay time period for which the holder of the mobile terminal 200 stays on the floor estimated by the floor estimation part 1240 and associates the movement history over the specified floor stay time period and the floor with each other. Processing for specifying the floor stay time period is more specifically described. The floor division part 1270 specifies the time period from the end time (te) of the elevator riding time period, which is used by the floor estimation part 1240 to estimate the floor, to the start time (ts) of the subsequent elevator riding time period as the floor stay time period corresponding to the floor. In this manner, the time period for which the holder of the mobile terminal 200 has stayed on the floor is specified.

Then, the floor division part 1270 associates the movement history from the start time to the end time of the floor stay time period and the floor on which the holder of the mobile terminal 200 has stayed for the floor stay time period with each other.

In the manner described above, the movement history of the holder of the mobile terminal 200 can be specified for each floor. In addition, the movement history of the holder of the mobile terminal 200 can be output for each floor.

Eighth Embodiment

Figure 20:
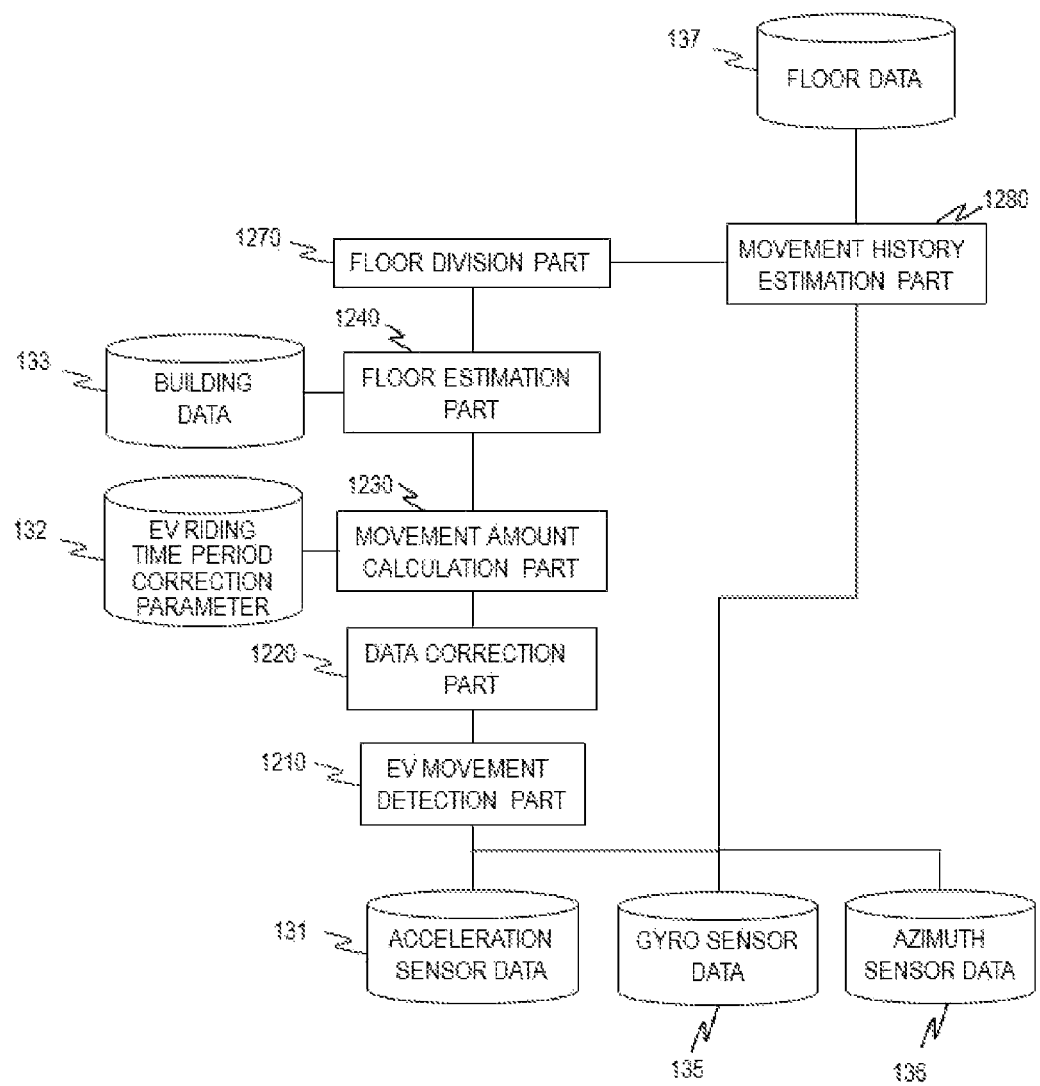
FIG. 20 is a functional block diagram of the movement amount estimation system according to an eighth embodiment of this invention.

Now, an eighth embodiment of this invention is described referring to FIGS. 20 and 21.

In the eighth embodiment, the holder of the mobile terminal 200 starts moving at a doorway of the elevator on each floor. Therefore, by associating a starting point of the movement history of the holder of the mobile terminal 200 with coordinates of the doorway of the elevator, the movement history and coordinates of the floor are associated with each other. In this manner, the movement history on the floor map can be output.

FIG. 20 is a functional block diagram of the movement amount estimation system according to the eighth embodiment of this invention. Among the functional blocks illustrated in FIG. 20, the same functional blocks as those according to the seventh embodiment illustrated in FIG. 19 are denoted by the same reference symbols, and the description thereof is herein omitted.

The auxiliary storage 130 of the server 100 stores floor data 137. The floor data 137 contains at least the coordinates of the floors of the building and the coordinates of the doorway of the elevator on each floor. The details of the floor data 137 are described later referring to FIG. 21.

When the movement history and the floor are associated with each other by the floor division part 1270, the movement history estimation part 1280 refers to the floor data 127 to specify the coordinates of the elevator on the corresponding floor. Then, the movement history estimation part 1280 matches the specified coordinates of the elevator and coordinates corresponding to the start time of the floor stay time period in the movement history associated with the floor with each other so that a direction indicated by the movement history and an estimated direction of the floor match each other. In this manner, the estimated coordinates of the floor and the movement history are associated with each other.

FIG. 21 is an explanatory diagram of the floor data 137 according to the eighth embodiment of this invention.

The floor data 137 contains a building ID 2102, an ID 2101, a type 2103, an attribute 2104, a base floor 2105, a name 2106, and coordinates 2107.

As the building ID 2101, building identification information is registered. As the ID 2102, identification information of a target whose coordinates are to be set is registered. As the type 2103, a type of the target whose coordinates are to be set is registered. As the attribute 2104, an attribute of the target whose coordinates are to be set is registered. As the base floor 2105, a floor to which the target whose coordinates are to be set belongs is registered. As the name 2106, a name of the target whose coordinates are to be set is registered. As the coordinates 2107, coordinates of the target whose coordinates are to be set are registered.

For the floor data 137 shown in FIG. 21, the target whose coordinates are to be set, which has an outer shape or a floor junction point as the type 2103, is registered. In FIG. 21, "OUTER SHAPE" registered as the type 2103 indicates an outer shape of the floor, whereas "FLOOR JUNCTION POINT" registered as the type 2103 indicates a junction point between the floors, which corresponds to the concept including an elevator and stairs.

As the coordinates 2107 for an entry having "OUTER SHAPE" as the attribute 2104, coordinates of the floor are registered. As the coordinates 2107 for an entry having "ELEVATOR" as the attribute 2104, coordinates of the doorway of the elevator are registered. As the coordinates 2107 for an entry having "STAIRS" as the attribute 2104, coordinates of a doorway of the stairs are registered.

The movement amount estimation system illustrated in FIG. 20 does not estimate the stair travel distance. Therefore, an entry having "STAIRS" as the attribute 2104 of the floor data 137 shown in FIG. 21 is not used. The case where the entry having "STAIRS" as the attribute 2104 of the floor data 137 shown in FIG. 21 is used is described later as a variation of this embodiment.

Next, processing in which the movement history estimation part 1280 refers to the floor data 137 to specify the coordinates of the elevator on the floor associated with the movement history by the floor division part 1270 is specifically described.

The movement history estimation part 1280 acquires entries having "ELEVATOR" registered as the attribute 2104 of the floor data 137. Then, the movement history estimation part 1280 acquires an entry having the floor associated with the movement history as the base floor 2105 from the acquired entries so as to specify the coordinates of the doorway of the elevator, which are registered as the coordinates 2107 of the acquired entry. In this manner, the coordinates of the elevator on the floor associated with the movement history by the floor division part 1270 are specified.

By the processing described above, the starting point of the movement history of the holder of the mobile terminal 200 is associated with the coordinates of the doorway of the elevator. As a result, the movement history and the coordinates of the floor can be associated with each other.

The variation of the eighth embodiment is described next.

The movement amount estimation system of the variation of this embodiment includes a stair movement amount estimation part in addition to the functional blocks illustrated in FIG. 20. As described above in the sixth embodiment referring to FIG. 18, the stair movement amount estimation part calculates a stair movement amount corresponding to the movement amount of the holder of the mobile terminal 200 when the holder takes the stairs based on the acceleration sensor data 131.

The floor estimation part 1240 adds the movement amount of the holder when the holder uses the elevator, which is calculated by the movement amount calculation part 1230, or the movement amount of the holder when the holder takes the stairs, which is calculated by the stair movement amount estimation part, to the total movement amount before the calculation of the calculated movement amount. In this manner, the floor estimation part 1240 calculates the height at which the holder is located after the movement and estimates the floor at the height which is the closest to the calculated height as the floor to which the holder has moved.

Moreover, the floor estimation part 1240 specifies whether the holder of the mobile terminal 200 has moved to the estimated floor by taking the stairs or using the elevator. Specifically, the floor estimation part 1240 specifies that the holder has moved to the corresponding floor by using the elevator when the movement amount used to estimate the floor is the movement amount with the elevator and that the holder has moved to the corresponding floor by taking the stairs when the movement amount used to estimate the floor is the movement amount with the stairs.

When the floor stay time period is to be specified, the floor division part 1270 specifies a time period from the end time of the elevator riding time period or the end time of the stair movement time period to the start time of the subsequent elevator riding time period or the start time of the subsequent stair movement time period as the floor stay time period.

When the holder of the mobile terminal 200 has moved to the floor estimated by the floor estimation part 1240 by taking the stairs, the movement history estimation part 1280 refers to the floor data 137 to associate the starting point of the movement history with the coordinates of the doorway of the stairs with each other. On the other hand, when the holder of the mobile terminal 200 has moved to the floor estimated by the floor estimation part 1240 by using the elevator, the movement history estimation part 1280 refers to the floor data 137 to associate the starting point of the movement history with the coordinates of the doorway of the elevator with each other.

By the processing described above, when the holder of the mobile terminal 200 has moved to a certain floor by taking the stairs, the doorway of the stairs is set as the starting point of the movement history on the corresponding floor. On the other hand, when the holder of the mobile terminal 200 has moved to a certain floor by using the elevator, the doorway of the elevator is set as the starting point of the movement history on the corresponding floor. Therefore, irrespective of whether the holder of the mobile terminal 200 has moved by taking the stairs or by using the elevator, an appropriate location can be set as the starting point of the movement history.

Ninth Embodiment

Now, a ninth embodiment of this invention is described referring to FIGS. 22 to 26C.

A movement amount estimation system according to the ninth embodiment acquires radio field intensity data from the mobile terminal 200, associates a time of the acquired radio field intensity data and a time of the movement history for each floor with each other, and displays the movement history for each floor and a radio field intensity associated with the movement history. In this manner, the administrator can more easily obtain the degree of radio field intensity on each floor. The ninth embodiment is applicable to the eighth embodiment.

Figure 22:
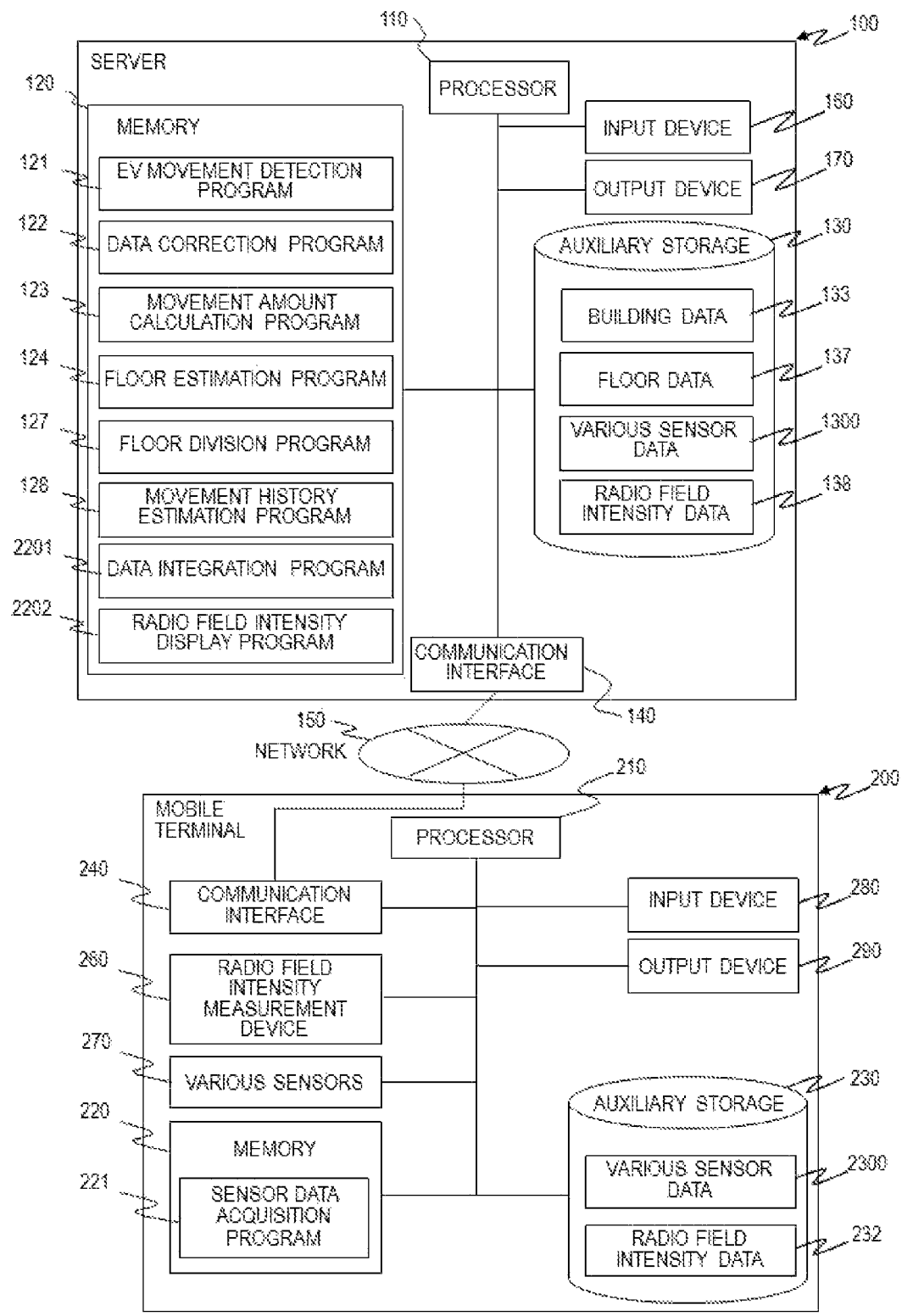
FIG. 22 is an explanatory diagram of a configuration of the movement amount estimation system according to a ninth embodiment of this invention.

FIG. 22 is an explanatory diagram of a configuration of the movement amount estimation system according to the ninth embodiment of this invention. Among the components and programs illustrated in FIG. 22, the same components and programs as those according to the first embodiment illustrated in FIG. 1 are denoted by the same reference symbols, and the description thereof is herein omitted.

The server 100 includes the processor 110, the memory 120, the auxiliary storage 130, the communication interface 140, an input device 160, and an output device 170. The input device 160 is a device for allowing the administrator of the server 100 to input various information to the server 100, and is, for example, a keyboard or a mouse. The output device 170 is a device for displaying a display screen, and is, for example, a display.

In the memory 120, the EV movement detection program 121, the data correction program 122, the movement amount calculation program 123, a floor estimation program 124, a floor division program 127, a movement history estimation program 128, a data integration program 2201, and a radio field intensity display program 2202.

The EV movement detection program 121, the data correction program 122, and the movement amount calculation program 123 have been described in the first embodiment, and therefore the description thereof is herein omitted.

The floor estimation program 124 is a program for implementing the floor estimation part 1240 illustrated in FIG. 11 according to the third embodiment, and therefore the description thereof is herein omitted. The floor division program 127 is a program for implementing the floor division part 1270 illustrated in FIG. 19 according to the seventh embodiment and illustrated in FIG. 20 according to the eighth embodiment, and therefore the description thereof is herein omitted. The movement history estimation program 128 is a program for implementing the movement history estimation part 1280 illustrated in FIG. 20 according to the eighth embodiment, and therefore the description thereof is herein omitted.

The data integration program 2201 associates the radio field intensity data collected from the mobile terminal 200 and movement history data calculated by the movement history estimation program 128 with each other. Processing by the data integration program 2201 is described later in detail referring to FIG. 24.

Figure 25A:
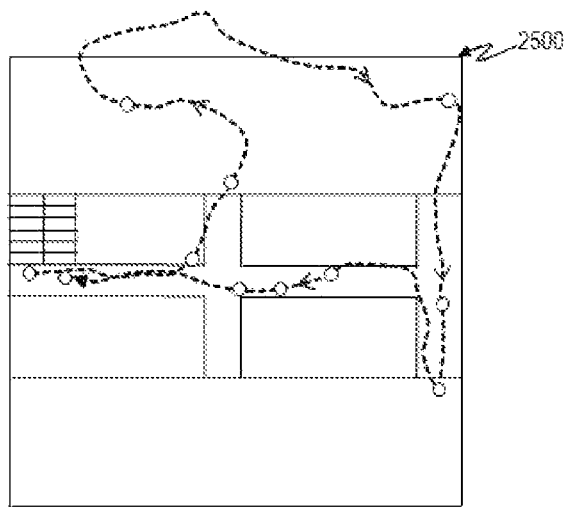
FIG. 25A is an explanatory diagram of a floor map screen on which movement history data and the radio field intensity data are plotted according to the ninth embodiment of this invention.
Figure 25B:
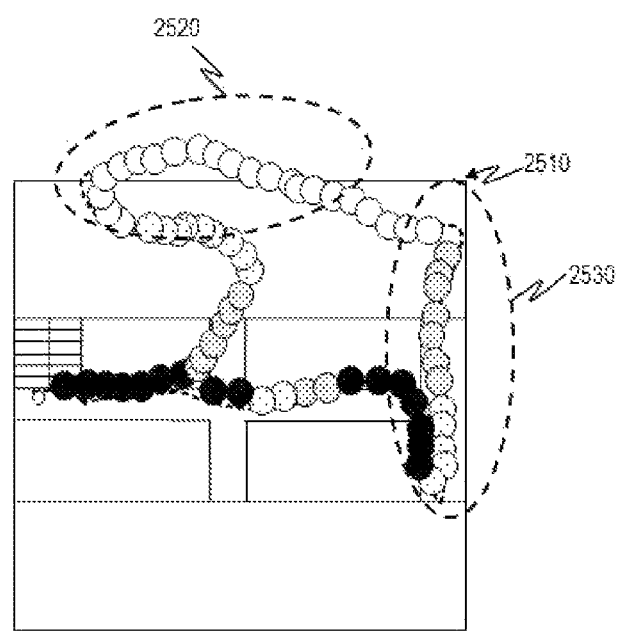
FIG. 25B is an explanatory diagram of the floor map screen when the radio field intensity data and the movement history data are overlapped with each other by the data integration program according to the ninth embodiment of this invention.

The radio field intensity display program 2202 overlaps the radio field intensity data associated with the movement history data by the data integration program 2201 with the movement history and displays a floor-map screen 2510, which is illustrated in FIG. 25B, containing the overlapped radio field intensity and movement history on the output device 170 included in the server 100.

The auxiliary storage 130 stores the building data 133, the floor data 137, various sensor data 1300, and radio field intensity data 138 therein.

The building data 133 has been described in the third embodiment referring to FIG. 13, and therefore the description thereof is herein omitted. The floor data 137 has been described in the eighth embodiment referring to FIG. 21, and therefore the description thereof is herein omitted. The various sensor data 1300 is a collective term for the acceleration sensor data 131, the gyro sensor data 135, and the azimuth sensor data 136. The radio field intensity data 138 is data indicating a radio field intensity collected from the mobile terminal 200. The radio field intensity data 138 is described later in detail referring to FIG. 23.

The mobile terminal 200 includes the processor 210, the memory 220, the auxiliary storage 230, the communication interface 240, a radio field intensity measurement device 260, various sensors 270, an input device 280, and an output device 290. The input device 280 is a device for allowing the holder of the mobile terminal 200 to input various information to the mobile terminal 200, and is, for example, a keyboard. The output device 290 is a device for displaying a display screen, and is, for example, a display. The mobile terminal 200 may alternatively include an input/output device having both the functions of the input device 280 and the functions of the output device 290. A touch panel is an example of the input/output device.

The radio field intensity measurement device 260 measures an intensity of a radio field output from a base station (not shown) for coupling of the mobile terminal 200 to the network 150 or the like.

The various sensors 270 is a collective term for the acceleration sensor 250, the gyro sensor (not shown), and the azimuth sensor (not shown).

The sensor data acquisition program 221 stores the result of measurement by the various sensors 270 in the auxiliary storage 230 as various sensor data 2300 associated with a time at which the result of measurement is obtained. The various sensor data 2300 is a collective term for the acceleration sensor data 231, the gyro sensor data (not shown), and the azimuth sensor data (not shown). Moreover, the sensor data acquisition program 221 stores the result of measurement by the radio field intensity measurement device 260 in the auxiliary storage 230 as radio field intensity data 232 associated with a time at which the result of measurement is obtained. The radio field intensity data 232 is described later in detail referring to FIG. 23.

Figures 23, 24:
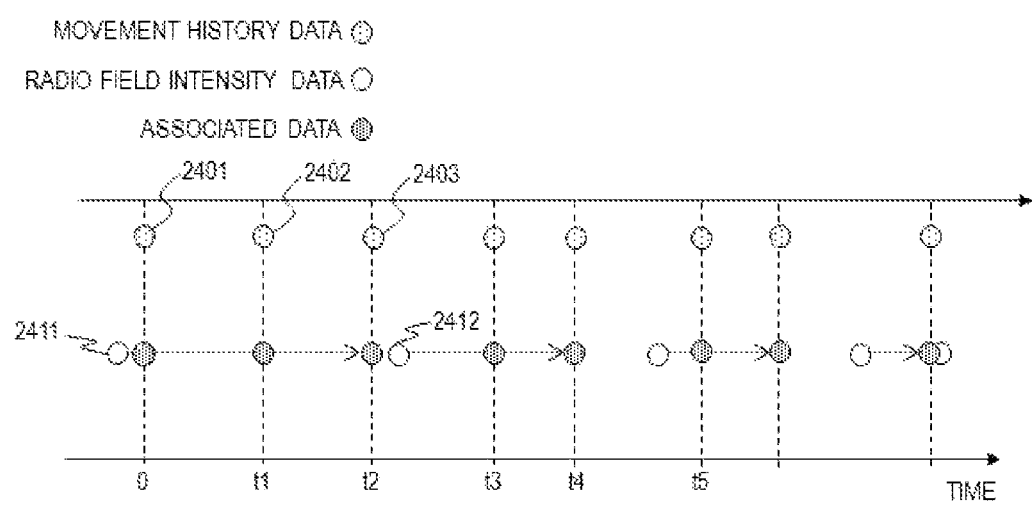
FIG. 23 is an explanatory diagram of radio field intensity data and the radio field intensity data according to the ninth embodiment of this invention.
FIG. 24 is an explanatory diagram of data integration processing by a data integration program according to the ninth embodiment of this invention.

FIG. 23 is an explanatory diagram of the radio field intensity data 138 and the radio field intensity data 232 (hereinafter referred to collectively as "radio field intensity data") according to the ninth embodiment of this invention.

The radio field intensity data contains a time 2301 and a radio field intensity 2302. As the time 2301, a time at which the radio field intensity is measured is registered. As the radio field intensity 2302, the radio field intensity is registered.

FIG. 24 is an explanatory diagram of data integration processing by the data integration program 2201 according to the ninth embodiment of this invention.

A period in which the radio field intensity measurement device 260 measures the radio field intensity is longer than a period in which the various sensors 270 measure the various data. In general, the measurement period of the radio field intensity measurement device 260 is one second, whereas the measurement period of the various sensors 270 is 10 milliseconds. Therefore, the movement history data calculated based on the various sensor data 1300 is detected in a 10-millisecond period.

The radio field intensity data is not associated with the movement history data calculated based on the various sensor data 1300 in a one-by-one fashion. Instead, the data integration program 2201 associates one piece of the radio field intensity data with a plurality of pieces of the movement history data.

As shown in FIG. 24, it is assumed that movement history data 2401 is detected at a time 0, movement history data 2402 is detected at a time t1, and movement history data 2403 is detected at a time t2. It is also assumed that radio field intensity data 2411 is detected at a time earlier than the time 0, and radio field intensity data 2412 is detected at a time between the time t2 and a time t3.

In this case, the data integration program 2201 associates the radio field intensity data 2411 with the movement history data 2401 to 2403 detected from the time 0 after the detection of the radio field intensity data 2411 to the time t2 before the detection of the subsequent radio field intensity data 2412.

In the manner described above, the data integration program 2201 can associate the radio field intensity data and the movement history data with each other.

The processing for associating the radio field intensity data and the movement history data, which is performed by the data integration program 2201, is not limited to that described above. For example, the data integration program 2201 may associate the radio field intensity data 2411 and the radio field intensity data 2412 having a closer detection time with the movement history data 2401 to 2403 detected between the detection of the radio field intensity data 2411 and the detection of the radio field intensity data 2412. Specifically, the data integration program 2201 associates the radio field intensity data 2411 with the movement history data 2401 and associates the radio field intensity data 2412 with the movement history data 2402 and 2403.

FIG. 25A is an explanatory diagram of a floor map screen 2500 on which the movement history data and the radio field intensity data are plotted according to the ninth embodiment of this invention.

In FIG. 25A, the movement history estimation program 128 uses the starting point of the movement history associated with the floor by the floor division program 127 as the coordinates of the stairs to plot the movement history data on the floor map of the corresponding floor. Then, the radio field intensity data measured at a measurement time of the radio field intensity data stored in the radio field intensity data 138 is associated with the movement history data corresponding to the measurement time. As a result, the radio field intensity data is plotted on the movement history plotted on the floor map. In FIG. 25A, the movement history is indicated by the dotted line, whereas the radio field intensity data is indicated by the circles.

FIG. 25B is an explanatory diagram of a floor map screen 2510 when the radio field intensity data and the movement history data are overlapped with each other by the data integration program 2201 according to the ninth embodiment of this invention.

On the floor map screen 2500 shown in FIG. 25A, the administrator cannot know a portion having a lower radio field intensity on the floor map at a glance.

Therefore, as described above referring to FIG. 24, the data integration program 2201 according to the ninth embodiment associates certain radio field intensity data with movement history data which is detected between the detection of the certain radio field intensity data to the subsequent detection of the radio field intensity data. In this manner, the radio field intensity data from the detection of the certain radio field intensity data to the subsequent detection of the radio field intensity data is complemented.

Then, the radio field intensity display program 2202 displays the floor map screen 2510 illustrated in FIG. 25B. On the floor map screen 2510, the radio field intensity data associated with the movement history data by the data integration program 2201 is overlapped with the movement history. Moreover, as illustrated in FIG. 25B, the radio field intensity display program 2202 displays the radio field intensity with the circles so that the color inside each of the circles becomes darker as a radio field intensity indicated by the radio field intensity data becomes higher.

In the manner described above, the administrator can more easily specify the position of a portion having a lower radio field intensity on the floor. For example, the administrator can specify a portion surrounded by a dotted line 2520 and a portion surrounded by a dotted line 2530 as portions having a lower radio field intensity.

Figure 26A:
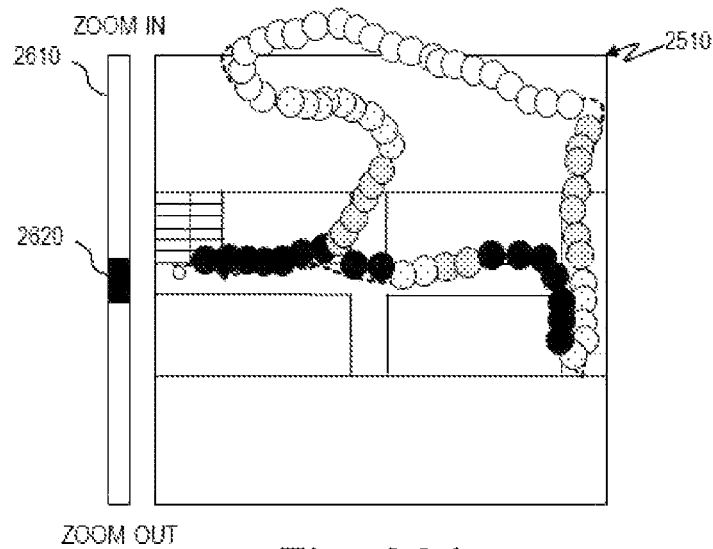
FIG. 26A is an explanatory diagram of the floor map screen additionally provided with a scroll bar according to the ninth embodiment of this invention.

FIG. 26A is an explanatory diagram of the floor map screen 2510 additionally provided with a scroll bar 2610 according to the ninth embodiment of this invention.

The scroll bar 2610 is displayed on the left of the floor map screen 2510 illustrated in FIG. 26A. When the administrator operates a knob 2620 of the scroll bar 2610 downward, the radio field intensity display program 2202 reduces the floor map screen 2510 in size in accordance with an operation amount of the knob 2620. Specifically, for a larger downward operation amount of the knob 2620, the radio field intensity display program 2202 more reduces the floor map screen 2510 in size.

On the other hand, when the administrator operates the knob 2620 of the scroll bar 2610 upward, the radio field intensity display program 2202 enlarges the floor map screen 2510 in size in accordance with an operation amount of the knob 2620. Specifically, for a larger upward operation amount of the knob 2620, the radio field intensity display program 2202 more enlarges the floor map screen 2510 in size.

Figure 26B:
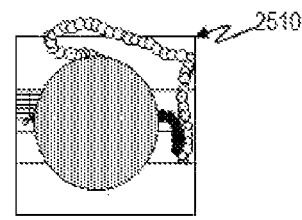
FIG. 26B is an explanatory diagram of the floor map screen reduced in size according to the ninth embodiment of this invention.
Figure 26C:
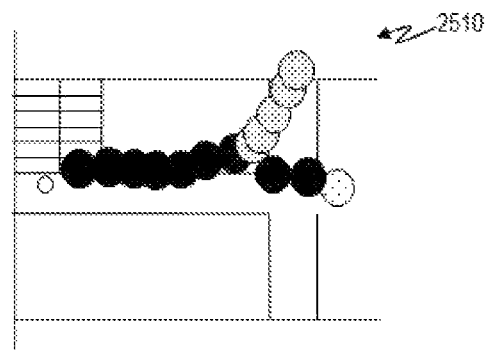
FIG. 26C is an explanatory diagram of the floor map screen enlarged in size according to the ninth embodiment of this invention.

FIG. 26B is an explanatory diagram of the floor map screen 2510 reduced in size according to the ninth embodiment of this invention. FIG. 26C is an explanatory diagram of the floor map screen 2510 enlarged in size according to the ninth embodiment of this invention.

As described above, the radio field intensity display program 2202 enlarges or reduces the floor map screen 2510 by the operation of the knob 2620 of the scroll bar 2610. When reducing the floor map screen 2510, if the radio field intensity display program 2202 reduces the floor map screen 2510 while maintaining the relationship between a scale of a diameter of the circle indicating the radio field intensity data illustrated in FIG. 25A and a scale of the floor map screen 2510, the circle indicating the radio field intensity data is displayed too small. As a result, the administrator cannot know a color density inside the circle indicating the radio field intensity data. Thus, as illustrated in FIG. 26B, the radio field intensity display program 2202 displays the floor map screen 2510 after changing the scale of the diameter of the circle indicating the radio field intensity data and the scale of the floor map screen 2510 so that the diameter of the circle indicating the radio field intensity data becomes larger.

By changing the scale of the diameter of the circle indicating the radio field intensity data and the scale of the floor map screen 2510 so that the diameter of the circle indicating the radio field intensity data becomes larger, a plurality of pieces of radio field intensity data are indicated by the circles with the increased diameters. Therefore, the radio field intensity display program 2202 calculates an average of the plurality of pieces of radio field intensity data which are present within a predetermined range from the center of the displayed floor map and displays the circles with a color density corresponding to the calculated average.

Moreover, when enlarging the floor map screen 2510, if the radio field intensity display program 2202 enlarges the floor map screen 2510 while maintaining the relationship between the scale of the diameter of the circle indicating the radio field intensity data illustrated in FIG. 25A and the scale of the floor map screen 2510, the circle indicating the radio field intensity data is displayed too large. Thus, as illustrated in FIG. 26C, the radio field intensity display program 2202 displays the floor map screen 2510 after changing the scale of the diameter of the circle indicating the radio field intensity data and the scale of the floor map screen 2510 so that the diameter of the circle indicating the radio field intensity data becomes smaller.

Figure 27:
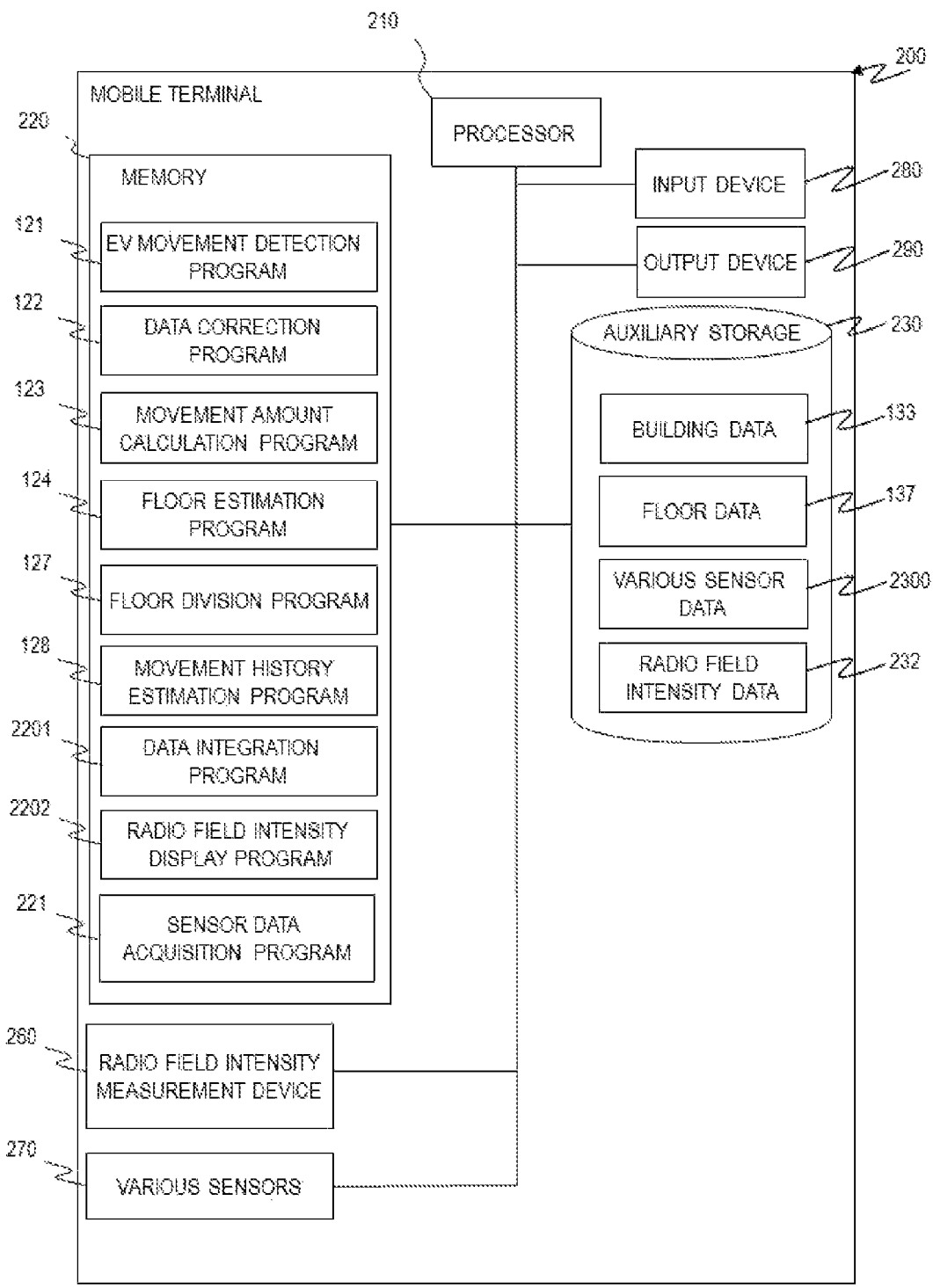
FIG. 27 is an explanatory diagram of a configuration of a movement amount estimation system of a variation of the ninth embodiment of this invention.

FIG. 27 is an explanatory diagram of a configuration of a movement amount estimation system of a variation of the ninth embodiment of this invention. Among the components and programs illustrated in FIG. 27, the same components and programs as those of the movement amount estimation system illustrated in FIG. 22 are denoted by the same reference symbols, and the description thereof is herein omitted.

Although the server 100 functions as the movement amount estimation system in FIG. 22, the mobile terminal 200 functions as the movement amount estimation system in FIG. 27.

Only differences from the mobile terminal 200 illustrated in FIG. 22 are now described. Besides the sensor data acquisition program 221, the memory 220 of the mobile terminal 200 stores the EV movement detection program 121, the data correction program 122, the movement amount calculation program 123, the floor estimation program 124, the floor division program 127, the movement history estimation program 128, the data integration program 2201, and the radio field intensity display program 2202.

Moreover, besides the various sensor data 2300 and the radio field intensity data 232, the auxiliary storage 230 of the mobile terminal 200 stores the building data 133 and the floor data 137.

It should be noted that this invention is not limited to the above-mentioned embodiments, and can include various variations. For example, the above-mentioned embodiments are detailed for the sake of easy understanding of this invention, and this invention is not limited to a case including all the described configurations. Moreover, a part of a configuration of a certain embodiment can be replaced by a configuration of another embodiment, and, to a configuration of a certain embodiment, a configuration of another embodiment can be added. Moreover, to a part of the configuration of each of the embodiment, another component can be added, or the part can be deleted, or replaced by another component.

Moreover, the respective configurations, functions, processing parts, the processing means, and the like in part or entirety may be realized as hardware by designing integrated circuits. Moreover, the respective configurations, functions, and the like may be realized as software by a processor interpreting and executing programs realizing the respective functions. Information on programs, tables, files, and the like for realizing the respective functions may be stored in a recording device such as a memory, a hard disk, and a solid state drive (SSD), and a recording medium such as an IC card, an SD card, and a DVD.

What is claimed is:

1. A movement amount estimation system, comprising a storage area configured to store acceleration data including a time of measurement by an acceleration sensor which a mobile terminal has and an acceleration measured by the acceleration sensor, for estimating a movement amount of a holder of the mobile terminal based on the acceleration sensor data, the movement amount estimation system further comprising:
an elevator riding time period detection part configured to detect a start time and an end time of an elevator riding time period of the holder based on an increase and decrease of the acceleration data stored in the storage area;
a movement velocity calculation part configured to integrate the acceleration data from the start time to the end time by a time period from the start time to the end time to calculate a movement velocity of the holder from the start time to the end time;
a movement velocity correction part configured to correct one of a movement velocity at the start time and a movement velocity at the end time based on another of the movement velocity at the start time and the movement velocity at the end time; and
a movement amount estimation part configured to integrate the movement velocity corrected by the movement velocity correction part by the time period from the start time to the end time to estimate a movement amount of the holder when the holder uses an elevator.

2. The movement amount estimation system according to claim 1, wherein:
the storage area stores a correction parameter corresponding to a time period for estimating a movement start time of the elevator earlier than the start time and a movement stop time of the elevator later than the end time; and
the elevator riding time period detection part is further configured to:
detect the start time and the end time based on a relationship between the increase and decrease of the acceleration data and preset threshold values; and
correct the start time to the movement start time earlier than the start time based on the correction parameter and the end time to the movement stop time later than the end time based on the correction parameter.

3. The movement amount estimation system according to claim 2, wherein:
the storage area stores building information in which a height of each floor of a building including the elevator installed therein is registered; and
the movement amount estimation system further comprises a floor estimation part configured to calculate a height at which the holder is located after movement using the elevator based on the movement amount estimated by the movement amount estimation part and refer to the building information to estimate a floor located at a height which is closest to the calculated height after the movement of the holder as a floor on which the holder is located after movement using the elevator.

4. The movement amount estimation system according to claim 3, further comprising a correction parameter adjustment part configured to adjust, in a case where the height after the movement of the holder, which is calculated by the movement amount estimation part, does not match the height of the floor estimated by the movement amount estimation part, the correction parameter so that the height after the movement of the holder, which is calculated by the movement amount estimation part, matches the height of the floor estimated by the movement amount estimation part.

5. The movement amount estimation system according to claim 3, further comprising:
a holder floor information receiving part configured to receive information for identifying a floor on which the holder is actually located after the floor, on which the holder is located after movement using the elevator, is estimated by the floor estimation part; and
a correction parameter adjustment part configured to adjust, in a case where the floor identified by the received information, on which the holder of the mobile terminal is actually located, and the floor estimated by the movement amount estimation part are different from each other, the correction parameter so that the height after the movement of the holder, which is calculated by the movement amount estimation part, and the height of the floor on which the holder of the mobile terminal is actually located match each other.

6. The movement amount estimation system according to claim 3, further comprising a stair movement amount estimation part configured to estimate a movement amount of the holder taking stairs based on the acceleration data, wherein:
the floor estimation part is further configured to:
calculate, as a total movement amount, at least one of:
a total upward movement amount which is a sum of an upward movement amount of the holder using the elevator, which is estimated by the movement amount estimation part, and an upward movement amount of the holder taking the stairs, which is estimated by the stair movement amount estimation part; and a total downward movement amount which is a sum of a downward movement amount of the holder using the elevator, which is estimated by the movement amount estimation part, and a downward movement amount of the holder taking the stairs, which is estimated by the stair movement amount estimation part; and
refer to the building information to estimate a height of the floor, which is closest to the calculated total movement amount; and
the movement amount estimation system further comprises a stair movement amount adjustment part configured to adjust, in a case where the calculated total movement amount and the estimated height of the floor do not match each other, a stair movement amount of the total movement amount so that the adjusted total movement amount and the estimated height of the floor match each other.

7. The movement amount estimation system according to claim 1, wherein:
the storage area stores building information in which a height of each floor of a building including the elevator installed therein is registered, angular velocity data including a time of measurement by a gyro sensor which the mobile terminal has and an angular velocity measured by the gyro sensor, and azimuth data including a time of measurement by an azimuth sensor which the mobile terminal has and a direction measured by the azimuth sensor; and the movement amount estimation system further comprises:

a floor estimation part configured to calculate a height at which the holder of the mobile terminal is located after movement using the elevator based on the movement amount estimated by the movement amount estimation part and refer to the building information to estimate a floor at a height which is closest to the calculated height after the movement of the holder as a floor on which the holder of the mobile terminal is located after movement using the elevator;

a horizontal movement history estimation part configured to estimate a horizontal movement history of the holder based on a horizontal acceleration of the acceleration data, the angular velocity data, and the azimuth data; and a floor division part configured to associate the horizontal movement history included in the horizontal movement history estimated by the horizontal movement history estimation part corresponding to a time period from the end time detected by the elevator riding time period detection part and a subsequent detection of the start time by the elevator riding time period detection part with the floor estimated by the floor estimation part.

8. The movement amount estimation system according to claim 7, wherein:

the storage area stores floor information in which coordinates of a doorway of the elevator on the floor are registered; and the horizontal movement history estimation part refers to the floor information to set coordinates of a starting point of the horizontal movement history associated by the floor division part with the floor estimated by the floor estimation part as the coordinates of the doorway of the elevator.

9. The movement amount estimation system according to claim 8, wherein:

the storage area stores radio field intensity data including a time of measurement by a radio field intensity sensor which the mobile terminal has and a radio field intensity measured by the radio field intensity sensor; and the movement amount estimation system further comprises:

a data integration part configured to associate a time of a movement locus measured by the horizontal movement history estimation part and the time of the radio field intensity data with each other to associate the movement locus and the radio field intensity data with each other; and a radio field display part configured to display the movement locus and the radio field intensity data associated with each other by the data integration part in an overlapping manner.

10. A movement amount estimation method for estimating, in a movement amount estimation system having a storage area configured to store acceleration data including a time of measurement by an acceleration sensor which a mobile terminal has and an acceleration measured by the acceleration sensor, a movement amount of a holder of the mobile terminal based on the acceleration sensor data, the movement amount estimation method including:

detecting a start time and an end time of an elevator riding time period of the holder based on an increase and decrease of the acceleration data stored in the storage area;

integrating the acceleration data from the start time to the end time by a time period from the start time to the end time to calculate a movement velocity of the holder from the start time to the end time;

correcting one of a movement velocity at the start time and a movement velocity at the end time based on another of the movement velocity at the start time and the movement velocity at the end time; and integrating the movement velocity corrected in the correcting of the movement velocity by the time period from the start time to the end time to estimate a movement amount of the holder when the holder uses an elevator.

11. The movement amount estimation method according to claim 10, wherein:

the storage area stores a correction parameter corresponding to a time period for estimating a movement start time of the elevator earlier than the start time and a movement stop time of the elevator later than the end time; and the detecting of the elevator riding time period includes:

detecting the start time and the end time based on a relationship between the increase and decrease of the acceleration data and preset threshold values; and correcting the start time to the movement start time earlier than the start time based on the correction parameter and the end time to the movement stop time later than the end time based on the correction parameter.

12. The movement amount estimation method according to claim 11, wherein:

the storage area stores building information in which a height of each floor of a building including the elevator installed therein is registered; and the movement amount estimation method further includes:

calculating a height at which the holder is located after movement using the elevator based on the movement amount estimated in the estimating of the movement amount and referring to the building information to estimate a floor located at a height which is closest to the calculated height after the movement of the holder as a floor on which the holder of the mobile terminal is located after movement using the elevator; and adjusting, when the height after the movement of the holder, which is calculated in the estimating of the floor, does not match the height of the floor estimated in the estimating of the floor, the correction parameter so that the height after the movement of the holder, which is calculated in the estimating of the floor, matches the height of the floor estimated in the estimating of the floor.

13. The movement amount estimation method according to claim 11, wherein:

the storage area stores building information in which a height of each floor of a building including the elevator installed therein is registered; and the movement amount estimation method further comprises:

calculating a height at which the holder of the mobile terminal is located after movement using the elevator based on the movement amount estimated in the estimating of the movement amount and referring to the building information to estimate a floor at a height which is closest to the calculated height after the movement of the holder as a floor on which the holder is located after movement using the elevator;

receiving information for identifying a floor on which the holder is actually located after the floor on which the holder is located after movement using the elevator is estimated in the estimating of the floor; and adjusting, in a case where the floor on which the holder is actually located, which is identified by the information received in the receiving of the information enabling identification of the floor on which the holder is actually located, and the floor which is estimated in the estimating of the floor are different from each other, the correction parameter so that the height calculated in the estimating of the floor, at which the holder is located after movement using the elevator, and the height of the floor on which the holder is actually located match each other.

14. The movement amount estimation method according to claim 10, wherein:

the storage area stores building information in which a height of each floor of a building including the elevator installed therein is registered, angular velocity data including a time of measurement by a gyro sensor which the mobile terminal has and an angular velocity measured by the gyro sensor, azimuth data including a time of measurement by an azimuth sensor which the mobile terminal has and a direction measured by the azimuth sensor, floor information in which coordinates of a doorway of the elevator on the floor are registered, and radio field intensity data including a time of measurement by a radio field intensity sensor which the mobile terminal has and a radio field intensity measured by the radio field intensity sensor; and the movement amount estimation method further comprises:

calculating a height at which the holder is located after movement using the elevator based on the movement amount estimated in the estimating of the movement amount and referring to the building information to estimate a floor at a height which is closest to the calculated height after the movement of the holder as a floor on which the holder is located after movement using the elevator;

estimating a horizontal movement history of the holder based on a horizontal acceleration of the acceleration data, the angular velocity data, and the azimuth data;

associating the horizontal movement history included in the horizontal movement history estimated in the estimating of the horizontal movement history corresponding to a time period from the end time detected in the detecting of the elevator riding time period to a subsequent detection of the start time in the detecting of the elevator riding time period, with the floor estimated in the estimating of the floor;

referring to the floor information to set coordinates of a starting point of the horizontal movement history associated with the floor estimated in the estimating of the floor in the associating of the horizontal movement history with the floor as the coordinates of the doorway of the elevator;

associating a time of a movement locus estimated in the estimating of the horizontal movement history and the time of the radio field intensity data with each other to associate the movement locus and the radio field intensity data with each other; and displaying the movement locus and the radio field intensity data associated with each other in the associating of the movement locus and the radio field intensity data in an overlapping manner.

15. A mobile terminal, comprising an acceleration sensor and a storage area configured to store acceleration data measured by the acceleration sensor, for estimating a movement amount of a holder of the mobile terminal based on the acceleration data, the mobile terminal further comprising:

an elevator riding time period detection part configured to detect a start time and an end time of an elevator riding time period of the holder based on an increase and decrease of the acceleration data stored in the storage area;

a movement velocity calculation part configured to integrate the acceleration data from the start time to the end time by a time period from the start time to the end time to calculate a movement velocity of the holder from the start time to the end time;

a movement velocity correction part configured to correct one of a movement velocity at the start time and a movement velocity at the end time based on another of the movement velocity at the start time and the movement velocity at the end time; and a movement amount estimation part configured to integrate the movement velocity corrected by the movement velocity correction part by the time period from the start time to the end time to estimate a movement amount of the holder when the holder uses the elevator.

* * * * *